(12) United States Patent
Iversen et al.

(10) Patent No.: US 11,279,883 B2
(45) Date of Patent: Mar. 22, 2022

(54) HEATING AND COOLING SYSTEM FOR HIGH PRESSURE PROCESSING SYSTEM

(71) Applicant: STEEPER ENERGY APS, Hørsholm (DK)

(72) Inventors: Steen Brummerstedt Iversen, Vedbæk (DK); Andrew Ironside, Alberta (CA); Claus Uhrenholt Jensen, Aalborg (DK)

(73) Assignee: STEEPER ENERGY APS, Hørsholm (DK)

( * ) Notice: Subject to any disclaimer, the term of this patent is extended or adjusted under 35 U.S.C. 154(b) by 283 days.

(21) Appl. No.: 16/491,715

(22) PCT Filed: Mar. 6, 2018

(86) PCT No.: PCT/EP2018/055445
§ 371 (c)(1),
(2) Date: Sep. 6, 2019

(87) PCT Pub. No.: WO2018/162462
PCT Pub. Date: Sep. 13, 2018

(65) Prior Publication Data
US 2021/0277313 A1    Sep. 9, 2021

(30) Foreign Application Priority Data

Mar. 7, 2017 (DK) .............. PA 2017 00160

(51) Int. Cl.
*C10G 1/08* (2006.01)
*C10G 3/00* (2006.01)

(52) U.S. Cl.
CPC ............ *C10G 3/42* (2013.01); *C10G 1/08* (2013.01); *C10G 2300/1011* (2013.01); *C10G 2300/4006* (2013.01)

(58) Field of Classification Search
CPC .... C10G 3/42; C10G 1/08; C10G 2300/4006; C10G 2300/1011
See application file for complete search history.

(56) References Cited

U.S. PATENT DOCUMENTS

| 5,252,224 A | 10/1993 | Modell et al. |
| 2011/0046423 A1* | 2/2011 | Sughrue ............ C10G 3/45 585/240 |

(Continued)

FOREIGN PATENT DOCUMENTS

EP    3 115 442 A1    1/2017

*Primary Examiner* — Tam M Nguyen
(74) *Attorney, Agent, or Firm* — Birch, Stewart, Kolasch & Birch, LLP

(57) ABSTRACT

The invention relates to a method of heating and cooling a feed mixture in a continuous high pressure process for transforming carbonaceous materials into liquid hydrocarbon products in a high pressure processing system adapted for processing a feed mixture at a temperature of at least 340° C. and a pressure of at least 150 bar, the high pressure processing system comprising a first and a second heat exchanger having a heat transfer fluid comprising at least 90% water, preferably at least 99% water circulating in the external part of the first and the second heat exchanger, the first heat exchanger comprising a cold internal input side and a hot internal output side, the second heat exchanger comprising a hot internal input side and a cold internal output side, the system further comprising a high pressure water heater and a high pressure water cooler between the first and the second heat exchanger, where the pressurized feed mixture is heated by feeding the feed mixture to the cold internal side of the first heat exchanger, heating and pressurizing the heat transfer fluid to a pressure of at least 240 bar and a temperature of at least 400° C. at the input to the hot external side of the first heat exchanger, where the cooled heat transfer fluid from the first heat exchanger (Continued)

having a temperature in the range 150 to 300° C. is further cooled to a temperature of 60 to 150° C. in the high pressure water cooler prior to entering the cold external side of the second heat exchanger, where the pressurized, heated and converted feed mixture is cooled to a temperature in the range 60 to 200° C. by feeding it to the internal side of the second heat exchanger, and where the partly heated heat transfer fluid is further heated in the high pressure water heater before entering the first heat exchanger.

20 Claims, 14 Drawing Sheets

(56) References Cited

U.S. PATENT DOCUMENTS

| | | | |
|---|---|---|---|
| 2012/0157729 A1* | 6/2012 | Kalnes | C10G 1/02 585/242 |
| 2015/0344382 A1* | 12/2015 | Eizenga | C10G 3/48 585/240 |
| 2019/0134597 A1* | 5/2019 | Iversen | C10G 53/16 |
| 2021/0062098 A1* | 3/2021 | Iversen | C10G 3/42 |

* cited by examiner

HEATING AND COOLING SYSTEM FOR HIGH PRESSURE PROCESSING SYSTEM

FIELD OF THE INVENTION

The present invention relates to the area of heating and cooling systems, in particular heating and cooling systems for use in high pressure continuous processing systems for transforming carbonaceous materials into hydrocarbons, where a need for heating and cooling of the high pressure process is needed.

BACKGROUND OF THE INVENTION

Numerous applications of high pressure continuous processes exist or are under development or in early stages of commercialization. Examples of such processes are hydrothermal and solvothermal processes e.g. for production of hydrocarbons such as transportation fuels lubricants or speciality chemicals, gases or carbonized products from carbonaceous materials such as biomass.

In connection with continuously operating such high pressure process systems the temperature must be increased and further must be decreased at the end of the process and for this purpose a number of solutions have been suggested.

Typically such processes operate at temperatures near the critical point of water and generally involve heating a feed mixture and cooling the product mixture. Various heating and cooling concepts have been proposed including at least partly heating by recovering heat from the product stream being cooled e.g. by direct heat exchange between the outgoing product stream and the incoming feed mixture. However, both the feed mixture and product mixture are both difficult feedstock that may lead to fouling, and eventually clogging may require periodic cleaning. Hence, it is desirable to have both streams flowing on the inner side of the tubes to avoid dead zones and which are more accessible and easier to clean. This is not obtainable by direct heat exchange.

Hence, alternative concepts with indirect heat exchange via a heat transfer medium such as steam, hot oil or molten salt has been proposed (Iversen, WO2015/169319A1). A disadvantage of such systems is that the heat exchangers need to be of a significant size to achieve the necessary heat transfer due to lower heat transfer coefficients and/or lower average temperature difference between the two fluids being heat exchanged and/or may have a limited working temperature range for operation.

Further for both the direct heating and the indirect heating concepts a further heating step using an external heat source is required to heat and trim the temperature of the feed mixture to the desired operating temperature e.g. by direct heating of the partly heated feed mixture e.g. in a fired heater (Iversen, WO2015/169319A1).

The disadvantage of such systems is that it requires several heat exchangers and the surface temperature may be difficult to control and induces a risk for overheating the process media, which may result in coking of the media, which can cause increased fouling.

Similarly cooling of product mixtures often requires precise control of product flows and/or surface temperatures in specific temperature ranges to avoid fouling caused by e.g. solidification of heavy compounds and/or sedimentation of suspended particles.

In such systems heating is a significant part of the overall energy input and even when regenerative systems are used, the input and hence the operating costs is significant (=OPEX). Further total heat transfer surface or the total weight of the heat exchangers for process media may be significantly reduced=reduced capital investment).

OBJECTIVE OF THE INVENTION

The object of the present invention is to therefore provide for a heating and cooling system as well as a method of operating such system that increases the energy efficiency of the high pressure process system in an economically viable way. Secondary objectives include providing a more controllable and/or easier to clean heating and cooling system.

DESCRIPTION OF THE INVENTION

According to one aspect of the present invention the objective of the invention is achieved through a method of heating and cooling a feed mixture in a continuous high pressure process for transforming carbonaceous materials into liquid hydrocarbon products in a high pressure processing system adapted for processing a feed mixture at a temperature of at least 340° C. and a pressure of at least 150 bar, the high pressure processing system comprising a first and a second heat exchanger having a heat transfer fluid comprising at least 90% water, preferably at least 99% water circulating in the external part of the first and the second heat exchanger, the first heat exchanger comprising a cold internal input side and a hot internal output side, the second heat exchanger comprising a hot internal input side and a cold internal output side, the system further comprising a high pressure water heater and a high pressure water cooler between the first and the second heat exchanger, where the pressurized feed mixture is heated by feeding the feed mixture to the cold internal side of the first heat exchanger, pressurizing and heating the heat transfer fluid to a pressure of at least 240 bar and a temperature of at least 400° C. at the input to the hot external side of the first heat exchanger, where the cooled heat transfer fluid from the first heat exchanger having a temperature in the range 150 to 300° C. is further cooled to a temperature of 60 to 150° C. in the high pressure water cooler prior to entering the cold external side of the second heat exchanger, where the pressurized, heated and converted feed mixture is cooled to a temperature in the range 60 to 200° C. by feeding it to the internal side of the second heat exchanger, and where the partly heated heat transfer fluid is further heated in the high pressure water heater before entering the first heat exchanger.

In an embodiment of the invention the process is a continuous high pressure process for transforming carbonaceous materials into renewable hydrocarbons comprising:
Providing a carbonaceous material
Preparing a feed mixture at least comprising:
Carbonaceous material,
water,
homogeneous catalyst in the form of potassium or sodium
liquid organic compounds in the form of recycled water soluble organics and/or renewable hydrocarbons produced by the process
Pressurizing the feed mixture to a conversion pressure of at least 150 bar,
Heating the pressurized feed mixture to a conversion temperature of at least 340° C.;
Maintaining the pressurized feed mixture at conversion pressure and conversion temperature for a predefined time
Cooling the product mixture to a temperature in the range 60 to 200° C.

Depressurizing the converted feed mixture to a pressure in the range 15 to 100 bar;

Separating the converted feed mixture into a hydrocarbon phase, water phase comprising dissolved salts and water soluble organics, and a gas phase and optionally a solid phase, Separating the water phase into a dischargeable water phase and a residual phase comprising potassium and sodium salts and water soluble organic compounds;

At least partly introducing the residual phase to the feed preparation step, where Heat is extracted from converted feed mixture cooling step in the second heat exchanger and transferred to the heating step in the first heat exchanger using a heat transfer fluid comprising at least 90% water, preferably at least 99%, at a pressure of at least 240 bar and a temperature of at least 400° C. at the inlet to the first heat exchanger, and where the cooled heat transfer fluid from the first heat exchanger having a temperature in the range 150 to 300° C. is further cooled to a temperature of 60 to 150° C. in a high pressure water cooler prior to entering the cold external side of the second heat exchanger, where the pressurized, heated and converted feed mixture is cooled to a temperature in the range 80 to 200° C. by feeding it to the inner side of the heat exchanger tubes in said second heat exchanger, and where the partly heated heat transfer fluid from the cooling step in the second heat exchanger is further heated, before entering the hot external side of the heat transfer tubes in feed mixture heating step in the first heat exchanger.

The pressure of the heat transfer fluid may according to an embodiment of the present invention be at least 240 bar, preferably the pressure of the heat transfer fluid is at least 300 bar, advantageously the pressure of the heat transfer fluid is at least 320 bar.

In many embodiments of the present invention, the temperature of the heat transfer fluid is at least 410° C.; preferably at least 430° C. such as in the range 420 to 450° C. before entering the first heat exchanger.

According to a particularly preferred embodiment according to the present invention, the outlet temperature of the heat transfer fluid from the feed heating step in the first heat exchanger is at least 150° C.; preferably at least 200° C.

Advantageously the outlet temperature of the heat transfer fluid from the feed heating step in the first heat exchanger is less than 275° C. such as less than 250° C.; preferably the outlet temperature of the heat transfer fluid from the feed heating step in the first heat exchanger is less 225° C. such as less than 210° C.

The heat transfer fluid from the heating step in the first heat exchanger is further cooled to a temperature of 80 to 150° C. before entering the cooling step in the second heat exchanger; preferably the heat transfer fluid from the first heat exchanger is cooled to a temperature of 100 to 140° C. such as 110 to 135° C. before entering.

The converted feed mixture is according to a preferred embodiment cooled to a temperature in the range 80 to 200° C. by feeding it to the internal side of the second heat exchanger; preferably the converted feed mixture is cooled to a temperature in the range 120 to 180° C. by feeding it to the internal side of the second heat exchanger.

The feed mixture is often heated to a temperature of at least 370° C. by the high pressure water in the first heat exchanger, preferably to a temperature in the range 380 to 430° C. such as 390 to 425° C. by the high pressure water.

The average velocity of the feed mixture in the heating step and the average velocity of the converted feed mixture during the cooling, are generally selected high enough to in the range 0.4 m/s to 5 m/s, preferably in the range 1.0 m/s to 5 m/s such as in the range 1.0 to 5 m/s.

The heat added to the high pressure water before entering the feed mixture heating step in the first heat exchanger is typically at least partly, preferably fully produced by combustion of byproducts from the process. In particular, the heat added to the high pressure water before entering the feed mixture heating step in the first heat exchanger may at least partly, preferably fully produced by combustion of gas from the process. The process gas used to provide said Preferably the feed mixture is heated to a temperature of at least 370° C. by the high pressure water, preferably to a temperature in the range 390 to 425° C. by the high pressure water.

Preferably the temperature of the fluid is at least 420° C., more preferred at least 430° C. The temperature is preferably in the range 420° C. to 450° C.

In an embodiment the heat added to the high pressure water before entering the feed mixture heating step is at least partly, preferably fully produced by combustion of byproducts from the process.

In a further embodiment the heat added to the high pressure water before entering the feed mixture heating step is at least partly, preferably fully produced by combustion of gas from the process.

In an embodiment the feed mixture being heated has a dry solid content of at 15% by weight such as a dry matter content of least 17.5 by weight; preferably the dry matter content is at least 20% by weight such as at least 25% by weight.

Advantageously the outlet temperature of the heat transfer fluid from the feed heating step in the first heat exchanger is at least 150° C.; preferably at least 200° C.

In an embodiment the heat extracted by cooling the high pressure water between the feed mixture heating step and the product cooling step is transferred to heat transfer medium comprising hot oil or steam, and distributed to the feed mixture preparation step and/or the recovery step and/or upgrading step The present invention provides several advantages compared to the prior art including:

- By applying the heat transfer fluid, which is essentially water, at the specified temperature and pressure provides attractive thermodynamic properties providing for high overall heat transfer coefficients and attractive temperature profiles in the feed mixture heating step in the first heat exchanger and the converted feed mixture cooling step in the second heat exchanger. Hereby a more efficient heat transfer is achieved, and hence a more energy efficient and economical overall process.
- Both the feed mixture and the converted feed mixture flow on the inner side of the heat transfer tubes in the first and second heat exchanger, and the clean high pressure water heat transfer fluid flows on the outside of the heat exchanger tubes. Hereby a more controllable and easier to clean heating and cooling system is provided.
- The further heating of heat transfer fluid in the high pressure water heater allow for a more controllable heat addition to a well defined media allowing for a high temperature without degradation and having a high heat capacity. Further the use of such media allow for a more controllable surface temperatures of the heat transfer tubes in the first heat exchangers whereby local hot spots and overheating of the feed mixture and resulting coking or fouling is minimized or eliminated. Hence, a more efficient and controllable heating system is obtained.

The use of byproducts from the process, and in particular gas from the process and/or to provide a major part of the fuel added to the further heating of the heat transfer fluid in the high pressure water heater results in an overall higher energy efficiency and more economical process that further has a lower carbon foot print.

The use of a high pressure water heater and a high pressure water cooler allows for a more flexible and controllable heat addition and cooling of the process flows e.g. to compensate for any unbalance between the heat added to the feed mixture in the first heat exchanger and the heat recovered in from the converted feed mixture in the second heat exchanger The use of a high pressure water cooler to further cool the cooled high pressure water from the heating step in the first heat exchanger allows for a further heat recovery from the heat transfer fluid and distribution of heat to other heat consuming parts of the process such as the feed preparation and/or recovery of residual phase comprising potassium and sodium salts and water soluble organic compounds for recycling and/or upgrading of the crude oil to finished products thereby allowing for an overall higher energy efficiency and more economical process that further has a lower carbon foot print, while minimizing the size of the second heat exchanger for cooling of the converted feed mixture and adapting to the temperature and pressure conditions for the product separation and purification.

By maintaining the inlet temperature of the heat transfer fluid in the specified range the surface temperature of the heat transfer tubes in the second heat exchanger for the feed mixture can be maintained at and controlled to a sufficiently high temperature so as to prevent solidification of high boiling compounds on the heat transfer surfaces without sacrificing the overall heat recovery. In many embodiments of the present invention such solidification of high boiling compounds may cause fouling of heat transfer surfaces and/or clogging of heat transfer tubes and/or a reduced on stream factor, and thereby provides a heating cooling system with an overall higher energy efficiency in an economically viable way that is more controllable.

When specifying the continuous high pressure process for transforming carbonaceous materials into liquid hydrocarbon products a continuous high pressure process for transforming carbonaceous materials into liquid hydrocarbon products, it should be appreciated that liquid hydrocarbon products comprise a broad spectrum of products including such comprising not only hydrogen and carbon but also heteroatoms such as oxygen, sulphur, nitrogen and others. It should further be appreciated that the high pressure cooler is located between the cold output for the heat transfer fluid in the first heat exchanger and the cold input side for the heat transfer fluid in the second heat exchanger. Likewise the high pressure heater is located between the hot output side for the heat transfer fluid in the second heat exchanger and the hot input side for the heat transfer fluid in the first heat exchanger. Further, wordings such as a heating step in a first exchanger or a cooling step in a second exchanger should be interpreted broadly e.g. the first heat exchanger may comprises several individual heat exchangers arranged in a series and parallel arrangement.

BRIEF DESCRIPTION OF THE DRAWINGS

The invention will in the following be described with reference to embodiments illustrated in the drawings where.

PREFERRED EMBODIMENTS

The embodiments presented should not be considered as limiting for the scope of the invention as many variations are possible within the scope of the claims.

Figure 1:
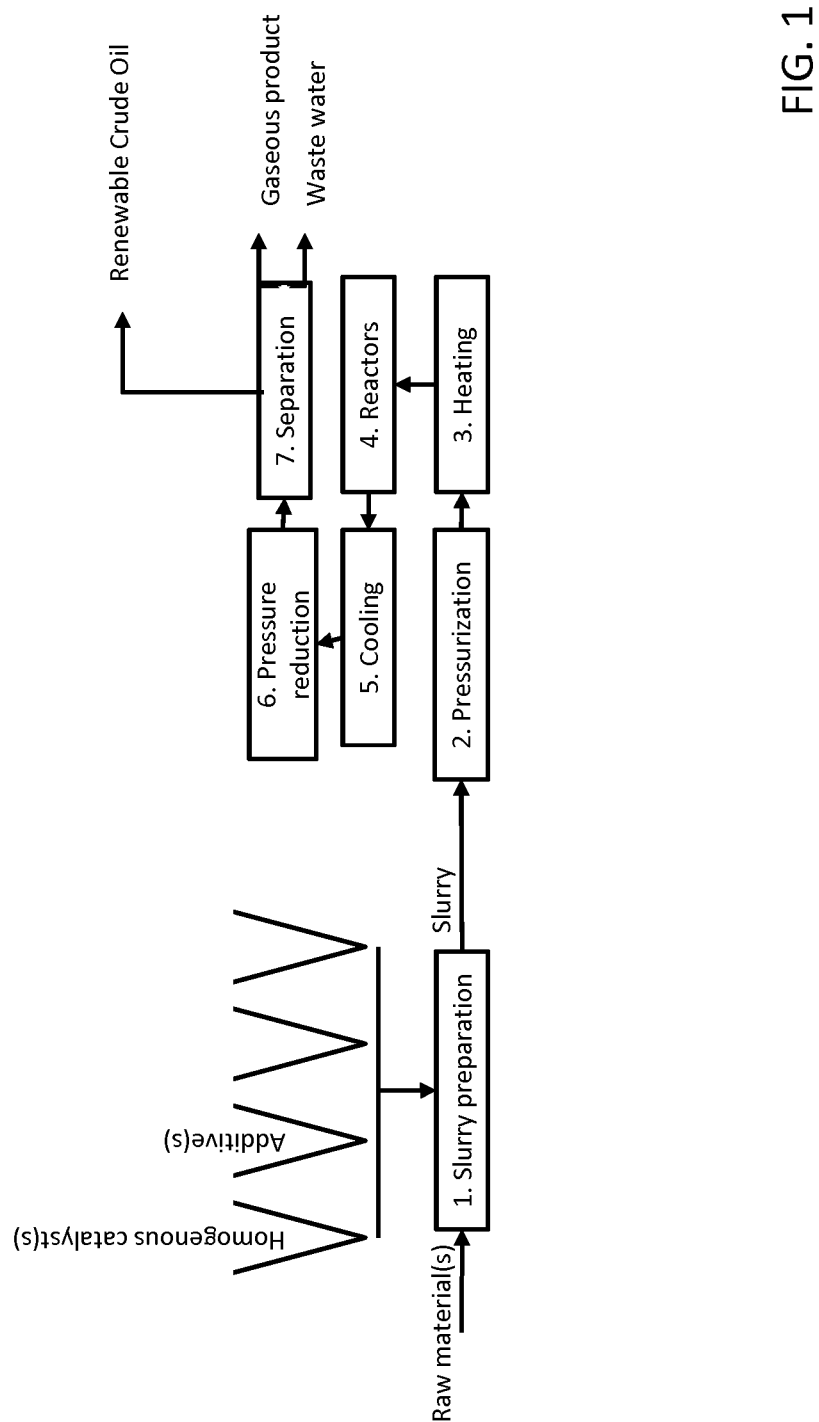
FIG. 1 shows a schematic overview of a continuous high pressure process for transforming carbonaceous materials into renewable hydrocarbons.

FIG. 1 shows an embodiment of a continuous high pressure production process for conversion of carbonaceous materials such as biomass to renewable oil comprising pumping means and pressurization means according to the present invention.

As shown on FIG. 1, the carbonaceous material is first subjected to a feed mixture preparation step (1). The feed mixture preparation step transforms the carbonaceous material into a pumpable feed mixture and often includes mechanical means for size reduction of the carbonaceous and slurrying the carbonaceous material with other ingredients such as water, catalysts and other additives such as organics in the feed mixture. In a preferred embodiment of the present invention, the feed mixture may be preheated in the pretreatment step. Often the feed mixture is preheated to a temperature in the range from about 150° C. to about 250°

C. in the pretreatment step such as temperature in the range from about 150° C. to about 220° C. Preferably the feed mixture is preheated to a temperature in the range from about 160° C. to about 200° C. such as in the range from about 160° C. to about 180° C.

Advantageously this is performed by transferring heat from the high pressure water cooler via a heat transfer medium such as hot oil or steam, whereby the overall heat recovery and energy efficiency are increased.

The second step is a pressurization step (2) where the feed mixture is pressurized by pumping means to a pressure of at least 150 bar and up to about 450 bar such as a pressure of least 180 bar and up to 400 bar; preferably the feed mixture is pressurized by pumping means to a pressure above the critical point of water such as a pressure of least 250 bar; more preferably the feed mixture is pressurized by pumping means to a pressure of at least 300 bar such as at least 320 bar. A particularly preferred embodiment according to the present invention is a feed mixture pressure after the pumping means of 320 to 350 bars.

The pressurized feed mixture is subsequently heated to a reaction temperature in the range from about 300° C. and up to about 450° C., such as a temperature in the range from about 340° C. to about 430° C.; preferably the pressurized feed mixture is subsequently heated to a reaction temperature in the range from about 370° C. and up to about 425° C., such a temperature in the range from about 390° C. to about 420° C.

The feed mixture is generally maintained at these conditions in sufficient time for conversion of the carbonaceous material e.g. for a period of 2 to 30 minutes, such as in the range 3 to 20 minutes; and preferably in the range 5 to 15 minutes, before it is cooled and the pressure is reduced.

The product mixture comprising liquid hydrocarbon product, water with water soluble organics and dissolved salts, gas comprising carbon dioxide, hydrogen, and methane as well as suspended particles from said converted carbonaceous material is subsequently cooled to a temperature in the range 70° C. to 250° C. such as in the range 120 to 180° C.;

The cooled product mixture thereafter enters a pressure reducing device, where the pressure is reduced from the conversion pressure to a pressure of less than 200 bars such as a pressure of less than 120 bars. Preferably the pressure is reduced to less than 90 bars such as less the 80 bars. More preferably the pressure is reduced to less than 50 bars such as a pressure in the range 10 bars to 40 bars.

Figure 6:
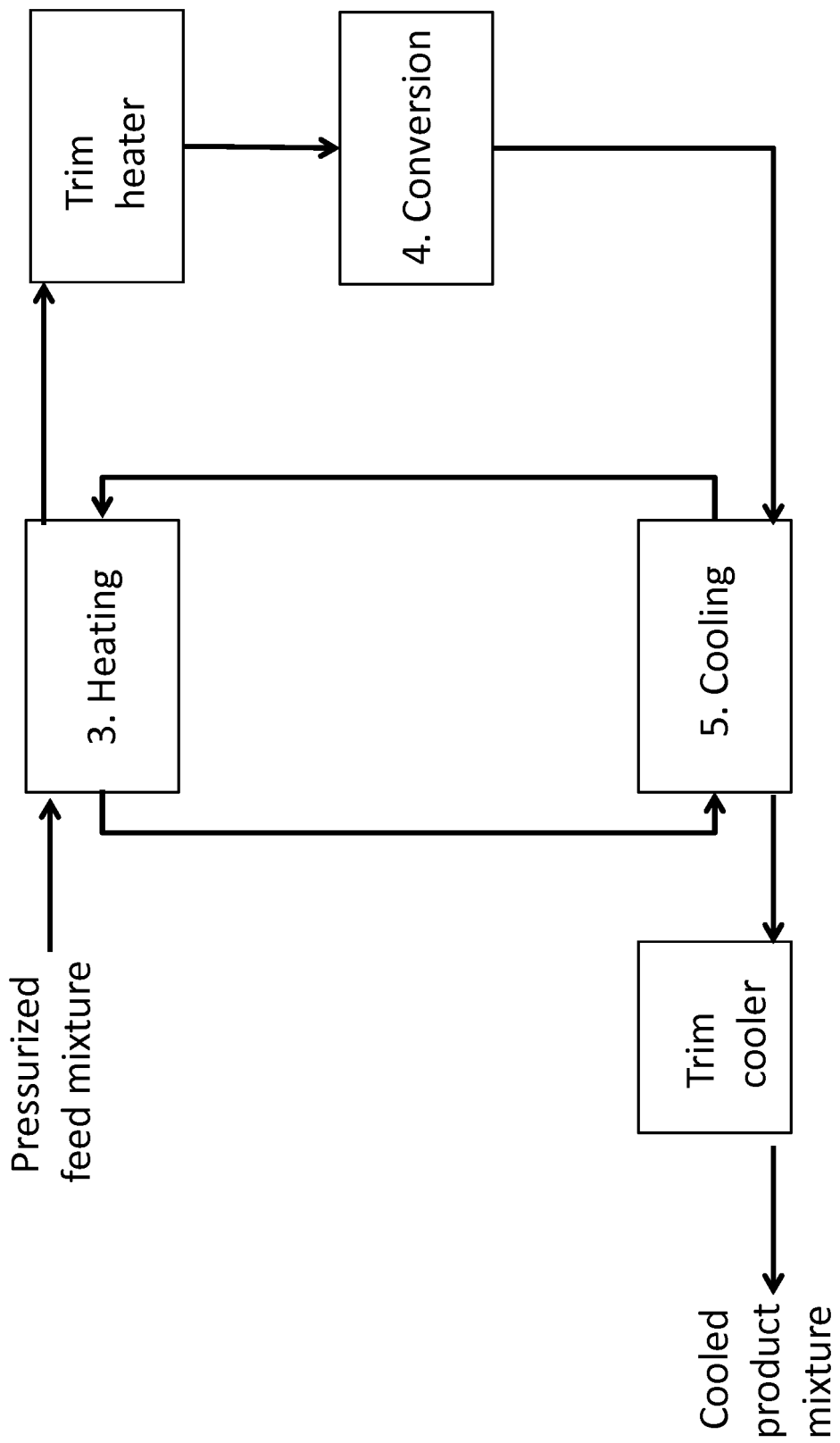
FIG. 6 shows a schematic overview of a continuous high pressure process comprising a prior art heating and cooling system with indirect heat exchange using a hot oil as heat transfer medium.

Suitable pressure reduction devices include pressure reduction devices comprising a number of tubular members in a series and/or parallel arrangement with a length and internal cross section adapted to reduce the pressure to desired level, and pressure reducing devices comprising pressure reducing pump units as further described under FIG. 6.

The converted feed mixture is further separated into at least a gas phase, a renewable crude oil phase, a water phase with water soluble organic compounds as well as dissolved salts and eventually suspended particles. The separation may be performed by gravimetric phase separation or other suitable means such as centrifugation, whereby the product mixture is separated into an oil phase, a water phase comprising homogeneous catalyst(-s) and water soluble organics, a gas phase comprising carbodioxide, hydrogen, carbon monoxide and C1-C4 hydrocarbons.

Many embodiments of continuous high pressure processing of carbonaceous material to hydrocarbons according to the present invention include a recovery step for recovering homogeneous catalyst(-s) and/or water soluble organics from said separated water phase, and at least partly recycling these to the feed mixture preparation step. Hereby by the overall oil yield and energy efficiency of the process is increased. A preferred embodiment according to the present invention is where the recovery unit comprises an evaporation and/or distillation step, where the heat for the evaporation and/or distillation is at least partly supplied by transferring heat from the high pressure water cooler via a heat transfer medium such as a hot oil or steam, whereby the overall heat recovery and/or energy efficiency is increased.

The renewable crude oil may further be subjected to upgrading process (not shown) where it is pressurized to a pressure in the range from about 20 bar to about 200 bars such as a pressure in the range 50 to 120 bar, before being heated to a temperature in the range 300 to 400° C. in one or more steps and contacted with hydrogen and heterogeneous catalyst(s) contained in one or more reaction zones, and eventually fractionated into different boiling point fractions.

Figure 2:
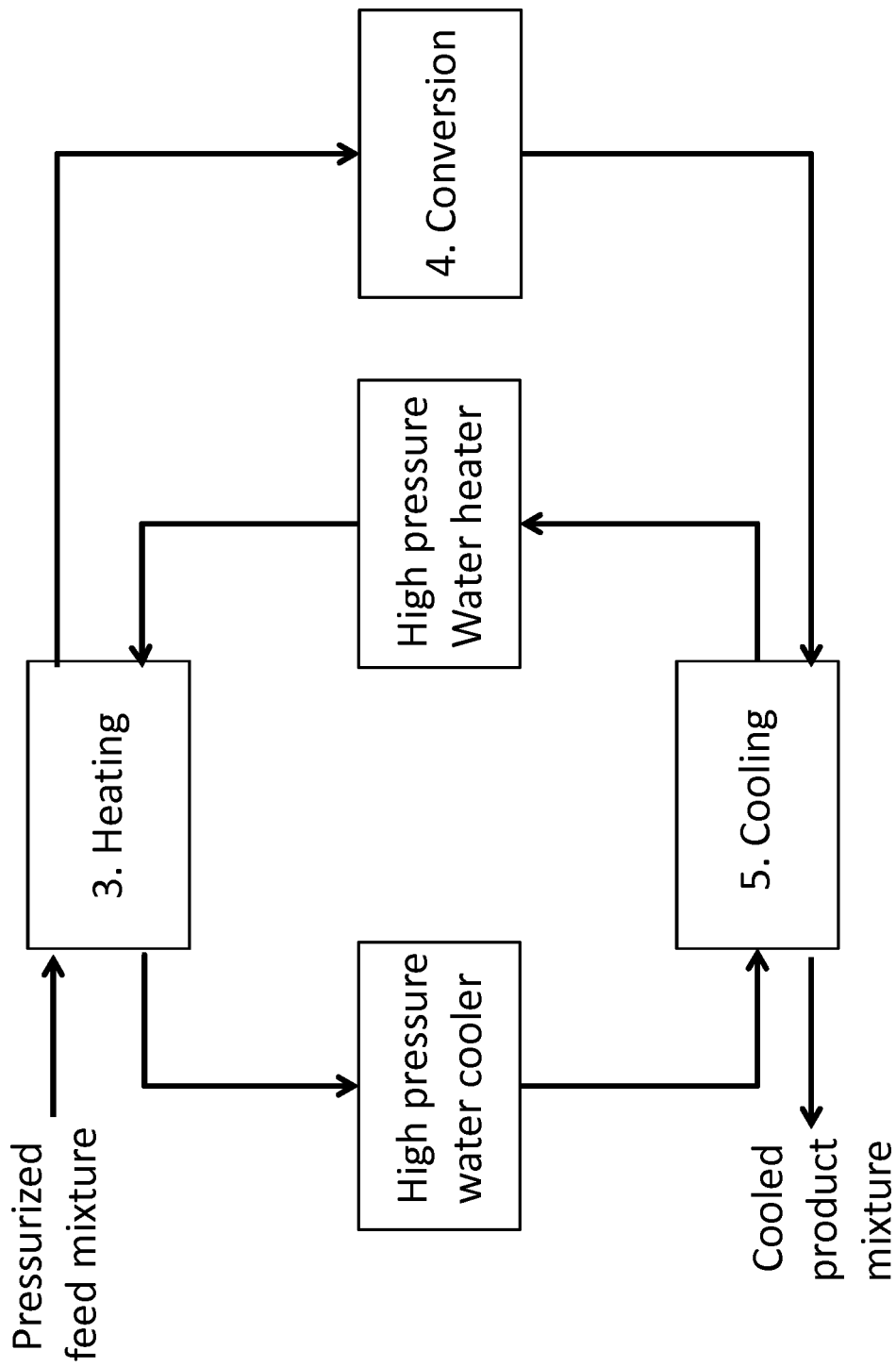
FIG. 2 shows a schematic overview of a first embodiment of a heating and cooling system according to the invention.

FIG. 2 shows a schematic overview of a first embodiment of a heating and cooling system according to the invention, where heat is extracted from the cooling step of the product mixture from the conversion step (4) and transferred to the feed mixture heating step (3) using high pressure water at a pressure above the critical pressure as heat transfer medium. The high pressure water from the cooler (5) is further heated prior to entering the feed mixture heater (3), and the cooled high pressure water from the feed mixture heater is further cooled in the high pressure water cooler, before entering the product cooler (5).

According to many applications of the present invention, the pressure of the high pressure water is at least 300 bar; preferably the pressure of the high pressure water is at least 320 bar such as in the range 320 to 350 bar.

In many embodiments according to the present invention both the feed mixture and the product mixture is considered as difficult fluids e.g. being fluids posing a fouling and/or deposition risk, and where the heat exchangers may require periodic cleaning. Hence, an advantageous embodiment of the present invention is where both the feed mixture heater (3) and the product cooler (5) is shell and tube heat exchangers with the process media flowing inside the tube and the high pressure water flowing om the shell side of the tubes. Hereby, the fluid flows can be easier controlled and dead zones are being minimized. Further the inner side of the tubes are more easily cleaned than the shell side e.g. by mechanical and/or chemical means or a combination thereof.

The flow area for the feed mixture of the first part of the feed mixture heater (3), where the viscosity of the feed mixture may be high, may be larger than in the subsequent part of the feed mixture heater (3), so as to minimize the pressure drop over the first part of the feed mixture heater. Hence, an embodiment of the present invention is, where the ratio of the flow area for the feed mixture in the first part of the feed mixture heater to flow area for the feed mixture in the subsequent part is at least 2, such as at least 4.

The flow area may for the feed mixture be changed by using more tubes of same dimensions in parallel or may be changed by changing the inner tube diameter. An advantageous embodiment of the present invention is where the inner diameter of tubes in the first part of the feed mixture heater (3) to inner diameter of the tubes in the subsequent part is at least 1.5 such as a ratio of at least 2.

In many applications according to the present invention, the temperature of feed mixture exiting the first part of feed mixture heater is at least 160° C. such as at least 170° C.

Preferably the temperature of feed mixture exiting the first part of feed mixture heater is at least 180° C. such as at least 190° C.

The average flow velocity of the feed mixture (defined as volume flow divided by the flow area) in the second part of the feed mixture heater is according to many embodiments of the present invention at least 1 m/s such as at least 1.5 m/s. Preferably the average flow velocity of the feed mixture (defined as volume flow divided by the flow area) in the second part of the feed mixture heater is at least 2 m/s such as at least 2.5 m/s.

The inlet feed mixture temperature to the feed mixture heater is according to many embodiments of the present invention in the range from about 20° C. to about 250° C. such as in the range from about 60° C. to about 220° C.; preferably the inlet feed mixture temperature to the feed mixture heater is in the range from about 80° C. to about 200° C. such as from about 120° C. to about 180° C.

The feed mixture is typically heated to a temperature of at least 340° C. by the high pressure water such as a temperature of at least 350° C.; preferably the feed mixture is heated to a temperature of at least 370° C. by the high pressure water such as a temperature of at least 390° C.; More preferably the feed mixture is heated to a temperature in the range from about 390° C. to about 425° C. by the high pressure water such as a temperature in the range 395 to about 420° C.

The temperature of the high pressure water entering the hot side of the feed mixture heating step (3) is generally at supercritical conditions such as at a temperature of least 400° C. before entering the feed mixture heater (3); preferably the temperature of the high pressure water is at least 420° C. such as at least 430° C.; more preferably the temperature of the high pressure water is at least 440° C. such as at least 450° C.

The high pressure water exiting the feed mixture heating step (3) is according to an embodiment of the present invention at a temperature of least 150° C. before exiting the feed mixture heater (3); preferably the temperature of the high pressure water exiting the feed mixture heating step (3) is at least 150° C. such as at least 200° C.; more preferably the temperature of the high pressure water the feed mixture heating step (3) is at least 230° C. such as at least 250° C.

The high pressure water exiting the feed mixture heater (3) is further cooled in the high pressure water cooler, before entering the product cooler (5). In many embodiments of the present invention the cooling of the high pressure water exiting the feed mixture heater (3) in the high pressure cooler is performed by heat transfer to a heat transfer medium such as a hot oil. The heat extracted in the high pressure water cooler may according to an embodiment of the present invention be distributed to other parts of the process via the heat transfer medium as shown and described in further details in relation to FIG. 5.

Several advantages are provided by the high pressure water cooler according to the present invention:
  The surface temperature of the heat transfer area in the product cooler (5) can be maintained at and controlled to a sufficiently high temperature so as to prevent solidification of high boiling compounds on the heat transfer surfaces without sacrificing the overall heat recovery. In many embodiments of the present invention such solidification of high boiling compounds may cause fouling of heat transfer surfaces and/or clogging of heat transfer tubes and/or a reduced on stream factor.
  The heat transfer area required in the product cooler (5) is significantly reduced due to a higher temperature driving force due to further cooling and heat recovery by the high pressure water cooler
  The high pressure water cooler provides an option to fine tune or to trim the operation of the product cooler (5).

Subsequent to the high pressure water cooler the high pressure water enters the product cooler on the shell side of the tubes.

Typically the inlet temperature of the high pressure water to the product mixture cooler (6) is at least 60° C. such as at least 80° C.; preferably the inlet temperature of the high pressure water to the product mixture cooler (6) is at least 100° C. such as at least 110° C. In many embodiments according to the present invention, the inlet temperature of the high pressure water to the product mixture cooler (6) is in the range 100° C. to 150° C. such as in the range 100-140° C.; preferably in the range 110-140° C.

Often the product mixture is cooled to a temperature in the range 60° C. to 250° C. in the cooler (6) such as in the range 100 to 200° C.; preferably the is cooled to a temperature in the range 120° C. to 180° C. such as to a temperature in the range 130° C. to 170° C. by heat exchange with the product mixture in the heat exchangers.

Figure 3:
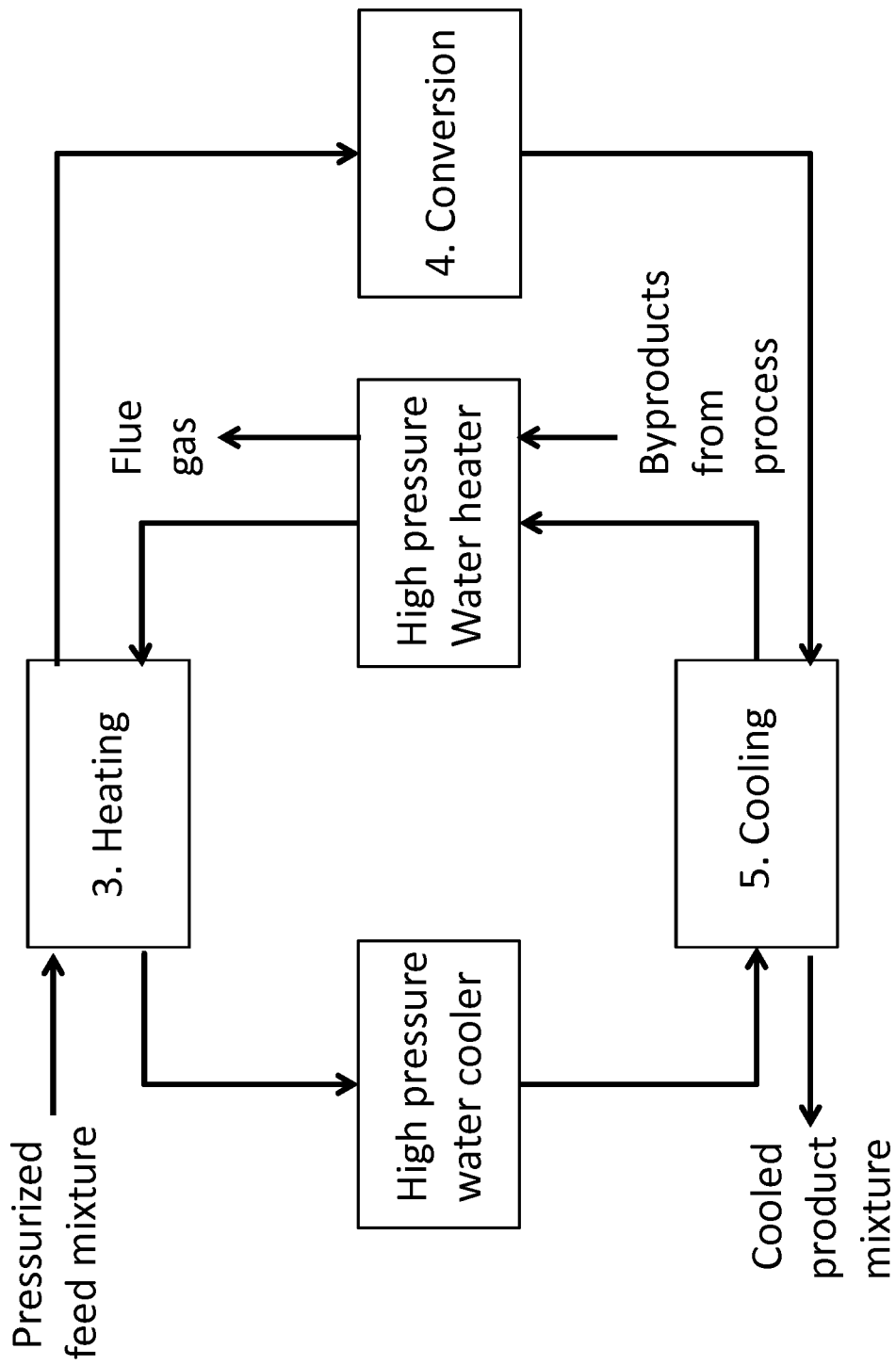
FIG. 3 shows a schematic overview of further embodiment of a heating and cooling system according to the invention where the high pressure heater is fueled with byproducts from the process.

FIG. 3 shows a schematic overview of further embodiment of a heating and cooling system according to the invention where the high pressure water heater is at least partly heated by combustion of by-products from the process. The by-products from may comprise process gas from the separation part of the process and/or from the upgrading part of the process, and/or fractions of the liquid hydrocarbons produced and/or water soluble organics a combustible solid product such as char produced by the process. Hereby the energy recovery is increased and a very energy efficient process is provided. An advantageous embodiment of the present invention is where substantially all of the heat required in the high pressure water heater is supplied by the process. Hereby the process becomes self-sustained with energy for heating the feed mixture, and a very energy efficient process is provided. The off gas from said combustion may be further cooled e.g. by heat transfer to heat transfer medium such as a hot oil or a pressurized stream of water or steam to produce saturated or superheated steam. The heat transfer medium may according to an advantageous embodiment used to distribute energy extracted from the high pressure water to other parts of the process such as to the feed preparation step and/or the recovery step and/or the upgrading step or a combination thereof.

In an alternative embodiment, the heat extracted by cooling the high pressure water between the feed mixture heating step in the first heat exchanger and the product cooling step in the second heat exchanger or by cooling the offgas from the high pressure water heating step is at least partly used for district heating.

Figure 4:
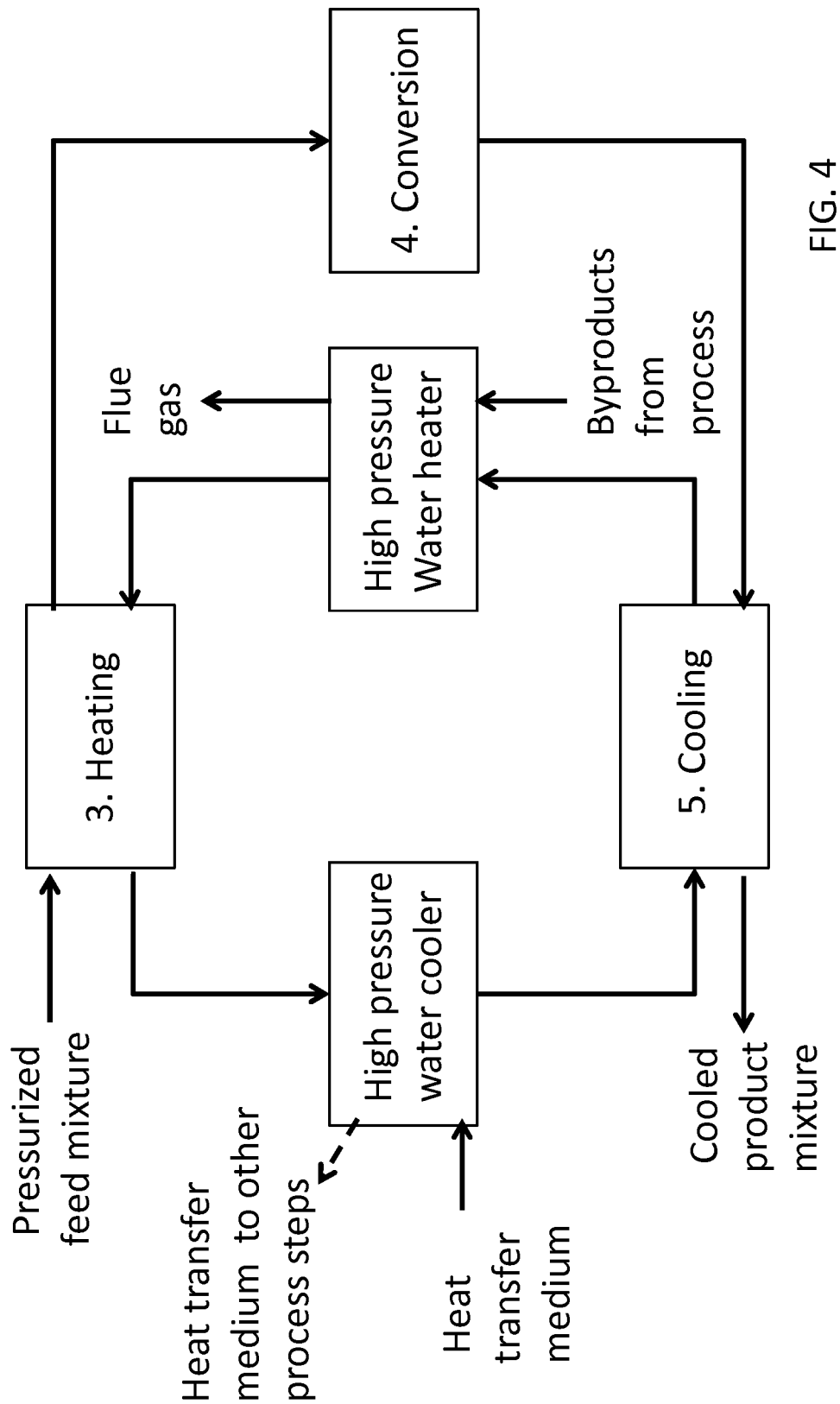
FIG. 4 shows a schematic overview of another embodiment of a heating and cooling system according to the invention, where heat is transferred to a heat transfer medium in the high pressure water cooler and distributed to other parts of the process.

FIG. 4 shows a schematic overview of another embodiment of a heating and cooling system according to the invention, where heat is transferred to a heat transfer medium in the high pressure water cooler and distributed to other parts of the process. The heat transfer medium may according to embodiments of the present invention comprise a hot oil, water and/or steam and the heat transfer medium may be used to distribute energy extracted from the high pressure water to other parts of the process such as to the feed preparation step and/or the recovery step and/or the upgrading step.

Figure 5:
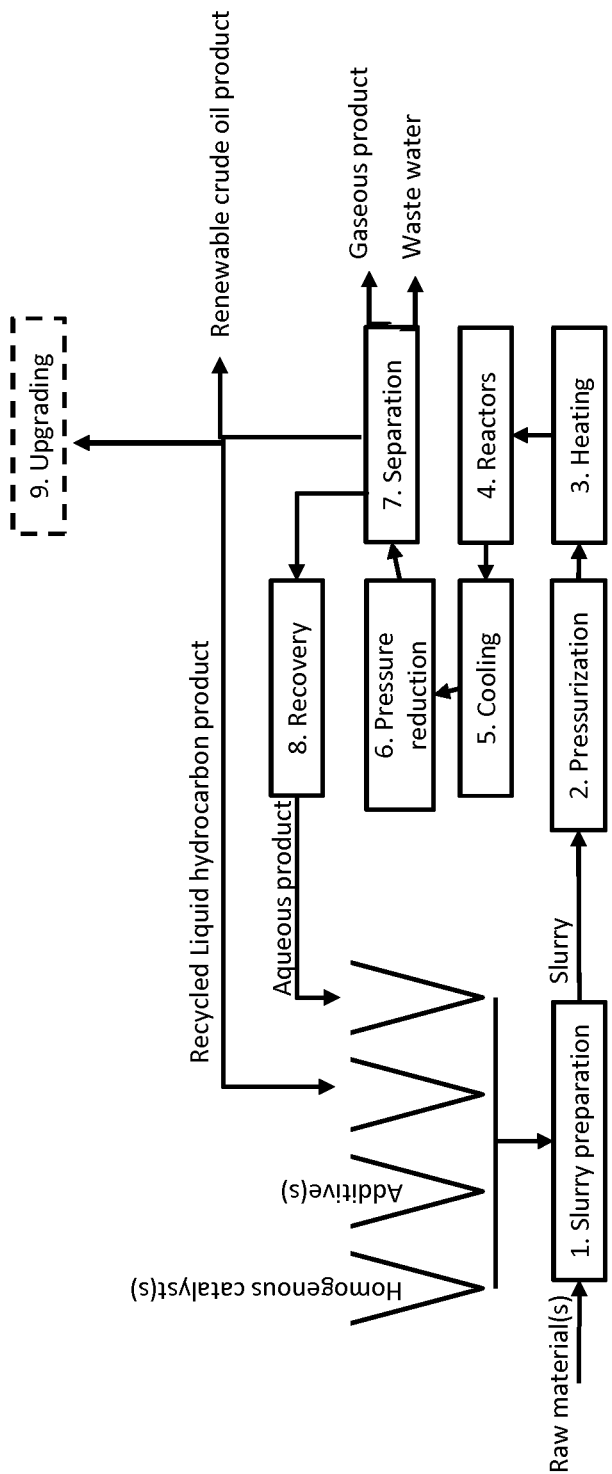
FIG. 5 shows a schematic overview of an advantageous embodiment of a heating and a cooling system according to the invention.

FIG. 5 shows an advantageous embodiment of a high pressure process for hydrothermal transformation of carbonaceous material such as biomass to renewable transportation fuels, lubricants and/or fine chemicals comprising pressurization and a pressure let down system according to the present invention.

1. Preparation of Feed Mixture

The first step of the process is to prepare a feed mixture in the form of a pumpable slurry of the carbonaceous material. This generally includes means for size reduction and slurrying such as dispersing the organic matter with other ingredients such as water, catalysts and other additives such as organics in the feed mixture.

A carbonaceous material according to the present invention may be in a solid form or may have a solid appearance, but may also be in the form of a sludge or a liquid. Further the carbonaceous material(-s) may be contained in one or more input streams.

Non limiting examples of carbonaceous feedstock according to the present invention include biomass such as woody biomass and residues such as wood chips, saw dust, forestry thinnings, road cuttings, bark, branches, garden and park wastes & weeds, energy crops like coppice, willow, miscanthus, and giant reed; agricultural and byproducts such as grasses, straw, stems, stover, husk, cobs and shells from e.g. wheat, rye, corn rice, sunflowers; empty fruit bunches from palm oil production, palm oil manufacturers effluent (POME), residues from sugar production such as bagasse, vinasses, molasses, greenhouse wastes; energy crops like miscanthus, switch grass, sorghum, jatropha; aquatic biomass such as macroalgae, microalgae, cyano bacteria; animal beddings and manures such as the fibre fraction from live stock production; municipal and industrial waste streams such as black liquor, paper sludges, off spec fibres from paper production; residues and byproducts from food production such as pomace from juice or wine production; vegetable oil production, sorted municipal solid waste, source sorted household wastes, restaurant wastes, slaughter house waste, sewage sludge, plastic, bitumen, lignite coal and combinations thereof.

Many carbonaceous materials according to the present invention are related to lignocellulose materials such as woody biomass and agricultural residues. Such carbonaceous materials generally comprise lignin, cellulose and hemicellulose.

An embodiment of the present invention includes a carbonaceous material having a lignin content in the range 1.0 to 60 wt % such as lignin content in the range 10 to 55% wt %. Preferably the lignin content of the carbonaceous material is in the range 15 to 40 wt % such as 20-40 wt %.

The cellulose content of the carbonaceous material is preferably in the range 10 to 60 wt % such as cellulose content in the range 15 to 45% wt %. Preferably the cellulose content of the carbonaceous material is in the range 20 to 40 wt % such as 30-40 wt %.

The hemicellulose content of the carbonaceous material is preferably in the range 10 to 60 wt % such as cellulose content in the range 15 to 45% wt %. Preferably the cellulose content of the carbonaceous material is in the range 20 to 40 wt % such as 30-40 wt %.

Depending on the specific organic matter being transformed and how it is received, the size reduction may be conducted in one or more steps e.g. the carbonaceous material may be treated as is and subsequently mixed with other ingredients in the same step or it may pre-grinded to a size suitable for further processing and size reduction in the mixing step. Often the carbonaceous material is size reduced to a particle size less than 10 mm such as a particle size of less than 5 mm the pre-grinding step; preferably to a particle size of less than 3 mm such as less than 2 mm.

The pre-grinding may according to an embodiment of the present invention be performed using a shredder, cutting mill, hammer mill, pan grinder, impeller mill or a combination thereof.

Advantageously the pre-grinding step may further comprise means for removal of impurities such as metals, stones, dirt like sand, and/or to separate off spec fibres from the carbonaceous material with particle size with said maximum size. Such means may comprise magnetic separation, washing, density separation such as flotation, vibration tables, acoustic separators, sieving and combinations thereof. Said means may be present prior to the pre-grinding step and/or after the pre-grinding step.

The carbonaceous material is subsequently mixed with other ingredients of the feed mixture. Other ingredients may include:

1. Recycled oil (hydrocarbons) produced by the process or a fraction of the oil (hydrocarbon produced by the process; preferably in a weight ratio to dry ash free organic matter in the range 0.5 to 1.5 such as a ratio 0.8 to 1.2; The recycled oil may comprise phenols, alkylated phenols, polyphenols, monomeric and oligomeric phenols, creosol, thymol, alkoxy phenols, p-coumaryl alcohol, coniferyl alcohol, sinapyl alcohol, flavenols, catechols.

2. Recycled concentrate of the water phase from the process comprising recovered homogeneous catalyst and water soluble organics such as one or more components selected from
   a. Ketones such as acetone, propanones, butanones, penthanones, penthenones, cyclopentanones such as 2,5 dimethyl cyclopentanone, cyclopentenones, hexanones and cyclohexanones such as 3-methyl hexanone, quionones etc.
   b. Alcohols and poly alcohols such as methanol, ethanol, propane's (incl isopropanol), buthanols, penthanols, hexanols, heptanols, octanols such as 2-butyl-1-octanol, hydroquinones etc
   c. Phenols, alkylated phenols, poly-phenols, monomeric and oligomeric phenols, creosol, thymol, alkoxy phenols, p-coumaryl alcohol, coniferyl alcohol, sinapyl alcohol, flavenols, catechols
   d. Carboxylic acids such as formic acid, acetic acid and phenolic acids like ferric acid, benzoic acids, coumarin acid, cinnamic acid, abietic acid, oleic acid, linoleic acid, palmetic acid, steric acid
   e. Furans such as THF etc
   f. Alkanes, alkenes, toluene, cumene etc.
   and combinations thereof.

In general the water soluble organics constitute a complex mixture of the above and the feed mixture may comprise such water soluble organics in a concentration from about 1% by weight to about 10% by weight such as in the range from about 2% by weight to about 5% by weight.

3. Make up homogeneous catalyst in form a potassium carbonate and/or potassium hydroxide and/or potassium acetate; preferably added in the form of an aqueous solution and added in an amount so that the total concentration of potassium in the resulting feed mixture is at least 0.5% by weight such as a concentration in the feed mixture of at least 1.0% by weight; preferably the concentration of potassium is at least 1.5% by weight such as at least 2.0% by weight;

4. Make up base for pH adjustment. Preferably sodium hydroxide is added to the feed mixture in an amount so as the pH measured in the recycled water phase is above 7 and preferably in the range 8.0 to 12.0 such as in the range 8.0 to 10.0.

The ingredients 1.-4. are preferably all on a liquid form and may advantageously be premixed and optionally preheated, before being mixed with the organic matter to produce said feed mixture. Premixing and/or preheating may reduce loading time and heating time required in the mixer.

The mixing of the carbonaceous material and other ingredients are mixed so as to form a homogeneous slurry or paste. Said mixer may according to the present invention be a stirred vessel equipped with means for efficiently mixing, dispersing and homogenizing viscous materials such as a planetary mixer, Kneader or Banbury mixer. The mixer is preferably further equipped with means for preheating said feed mixture to a temperature in the range 80 to 220° C., preferably in the range 130 to 200° C. and more preferably in the range 150 to 180° C. at sufficient pressure to avoid boiling such as a pressure in the range 1-30 bars, preferably in the range 4-20 bars such as in the range 5-10 bars. Heating the feed mixture to temperatures in the above ranges results in a softening and/or at least partly dissolution of the carbonaceous thereby making the feed mixture easier to size reduce and homogenize. Preferred means for heating said feed mixture during the preparation according to the present invention include a heating jacket. In a preferred embodiment the heat for preheating said feed mixture is obtained from the cooling of the converted carbonaceous material comprising liquid hydrocarbon product e.g. by use of a heat transfer medium for extraction of heat from the high pressure water cooler to a heat transfer medium and for distribution of heat as described in further details above in relation to FIG. 3-FIG. 5. Hereby the energy efficiency of the process may be further enhanced. The mixer may further be equipped with a re-circulation loop, where material is withdrawn from said mixer and at least partly re-circulated in an internal or external loop and re-introduced into said mixer so as to control the feed mixture characteristics e.g. rheological properties such as viscosity and/or particle size to a pre-defined level. The external loop may further comprise one or more size reduction and/or homogenization device(-s) such as a macerator and/or a colloidal mill and/or a cone mill or a combination thereof in a series and/or parallel arrangement.

Preferably, the carbonaceous material is fed to the mixer gradually rather than at once to control the viscosity of the feed mixture and that feed mixture remains pumpable, while being size reduced and homogenized. The control of the viscosity may be performed by measuring the power consumption of the mixer and/or colloidal mill and adding organic matter to the feed mixture according to a predefined power consumption. It is further advantageous not to empty the mixer completely between batches as the prepared feed mixture acts as a texturing agent for the next batch and thereby assists in homogenizing the next batch by making it more pumpable, and thereby the carbonaceous material may be added faster.

Other preferred means for thoroughly mixing and homogenizing the ingredients in the feed mixture include inline mixers. Such inline mixers may further introduce a cutting and/or a scissoring and/or a self-cleaning action. An preferred embodiment on such inline device include one or more extruders.

The feed mixture from the feed mixture mixing step may be fed to a holding tank before entering the pressurization step of the process. Said mixing tank may be equipped with means for agitating said feed mixture in the holding tank and/or circulation means for circulating said feed mixture around said holding tank whereby the feed mixture is maintained in a shear thinned and easier to pump state. Optionally the feed mixture may be expanded before entering the holding tank, whereby the feed mixture may be further size reduced and homogenized.

Typically the dry content of carbonaceous material in the feed mixture according to the present invention is in the range 10 to 40% by weight, preferably in the range 15 to 35% and more preferably in the range 20 to 35% by weight.

The process according to the present invention requires water to be present in said feed mixture. Typically the water content in said feed mixture is at least 30% by weight and in the range 30 to 80% by weight and preferably in the range 40 to 60%.

2. Pressurization

The second step of an advantageous embodiment of a high pressure process according to the present invention is pressurization to the desired pressure for said conversion process. According to the present invention said pressurization to the desired reaction pressure is essentially performed before heating from entry temperature from the feed mixture preparation step to the reaction temperature in the high pressure water heating cooling system is initiated Typically the feed mixture is pressurized to an operating pressure during said heating and conversion of at least 150 bars such as 180 bars, preferably said operating pressure is at least 221 bars such as at least 250 bars and more preferably said operating pressure during conversion is at least 300 bars. Even more preferably the operating pressure is in the range of 300-400 bars such as in the range 300-350 bars.

Many embodiments according to the present invention relates to processing of feed mixtures with a high content of carbonaceous material as described above. Such feed mixtures typically have densities in the range 1050 to 1200 kg/m3, and typically behaves as a homogeneous pseudoplastic paste rather than a suspension of discrete particles (liquid). The viscosity of such pastes may vary widely with shear rate due to the pseudoplastic (shear thinning) behavior and may be in the $10^3$ to $10^7$ cP depending of the specific shear rate and carbonaceous material being treated.

An aspect of the present invention relates to a pressurization system for pressurizing such highly viscous pseudoplastic feed mixtures. According to a preferred embodiment of the present invention, the pressurization system comprises two or more pressure amplifiers each comprising cylinders with a piston equipped with driving means for applying and/or receiving a force to the piston such as shown and described in connection with FIG. 2-9. Advantageous driving means for the pistons in the cylinders according to the present invention include hydraulically driven means.

In an advantageous embodiment pressure energy is recovered in the pressure reduction step described below under step 6. Pressure reduction, and transferred to an energy absorption reservoir, where the energy absorbed by the pressure reducing device is transferred to the reservoir for successive utilization in e.g. the pressurization step. Thereby a very energy efficient high pressure process is obtained.

3. Heating

The pressurized feed mixture is subsequently heated to a reaction temperature of at least 340 and up to about 450° C. such as in the range 350 to 430° C., preferably in the range 370 to 430° C. such as in the range 380 to 420° C., more preferred in the range 390 to 420° C. such as in the range 400 to 415° C.

According to the present invention, the heating of the feed mixture is performed by indirect heat exchange with high pressure water. By use of such heat transfer medium it is obtained that both the feed mixture and the product mixture may flow inside tubes thereby allowing for easier cleaning.

By said heat recovery it is obtained that the process becomes very energy efficient as most of the heat required is recovered. In many embodiments of the present invention at least 40% of the energy required to heat the feed mixture to the desired reaction temperature is being recovered such as at least 50% of the energy required to heat the feed mixture to the desired reaction temperature is being recovered. Preferably, at least 60% required to heat the feed mixture to the desired reaction temperature is recovered such as at least 70% of the energy required being recovered.

4. Reaction

Subsequent to heating to reaction temperature said pressurized and heated feed mixture is maintained at the desired pressure and temperature in a reaction zone c. for a predefined time. The feed characteristics and/or the combination of pressure and temperature according to the present invention generally allow for shorter reaction times and/or a more reacted liquid hydrocarbon product than in the prior art without sacrificing the yield and/or quality of the desired product. The predefined time in said reaction zone may according to an embodiment of the present invention be in the range 1 to 60 minutes such as 2 to 45 minutes, preferably said predefined time in said reaction zone is in the range 3 to 30 minutes such as in the range 3 to 25 minutes, more preferred in the range 4 to 20 minutes such as 5 to 15 minutes.

5. Cooling

The outlet stream from the reactor comprising liquid hydrocarbon product, water with water soluble organics and dissolved salts, gas comprising carbon dioxide, hydrogen, and methane and eventually suspended particles from the converted carbonaceous material, enters the cooler (6), where it is cooled by contact with high pressure water from the high pressure water cooler as shown and described in FIG. 2-4.

Typically the inlet temperature of the high pressure water to the product mixture cooler (6) is at least 60° C. such as at least 80° C.; preferably the inlet temperature of the high pressure water to the product mixture cooler (6) is at least 100° C. such as at least 110° C. In many embodiments according to the present invention, the inlet temperature of the high pressure water to the product mixture cooler (6) is in the range 100° C. to 150° C. such as in the range 110-140° C.

Often the product mixture is cooled to a temperature in the range 80° C. to 250° C. in the cooler (6) such as in the range 100 to 200° C.; preferably the is cooled to a temperature in the range 120° C. to 180° C. such as to a temperature in the range 130° C. to 170° C. by heat exchange with the product mixture in the heat exchangers.

A preferred embodiment of the present invention is where said heat exchange is performed by indirect heat transfer with high pressure water. By use of such indirect heat transfer via a heat transfer medium it is obtained that both the feed mixture and the product mixture can flow inside tubes thereby allowing for easier cleaning. The heat transfer medium may optionally be further heated and/or be further cooled so as to allow for added controllability and flexibility of the heating and cooling. Said heat transfer medium may also be used for transfer of heat to/from other unit operations of the process such as e.g. the pre-treatment 1 and/or the upgrading part of a process according to the present invention.

6. Pressure Reduction

The cooled product enters a pressure reducing device, where the pressure is reduced from the conversion pressure to a pressure of less than 200 bars such as a pressure of less than 120 bars. Preferably the pressure is reduced to less than 90 bars such as less the 80 bars. More preferably the pressure is reduced to less than 50 bars such as a pressure in the range 10 bars to 40 bars.

Suitable pressure reduction devices include pressure reduction devices comprising a number of tubular members in a series and/or parallel arrangement with a length and internal cross section adapted to reduce the pressure to desired level.

In a preferred embodiment the cooled product mixture enters a pressure reducing device, where the pressure reduction unit comprises at least one inlet and an outlet, the pressure reduction unit being adapted to receive a pressurized fluid at process pressure level at the inlet, being adapted to isolate the received pressurized fluid from the upstream process and from the outlet and being adapted to reduce the pressure of the fluid to a lower predetermined level and further being adapted to output the fluid through the outlet while still isolated towards the upstream process.

In general pressure reduction unit comprises an actuated valve at the inlet and an actuated valve at the outlet and between the inlet valve and the outlet valve a pressurization device. Further a pressure reduction unit according to an embodiment of the present invention comprises means for measuring the pressure upstream the inlet valve, between the inlet valve and the outlet valve and downstream the outlet valve.

The pressure reduction unit according to the present invention may further comprise a pump unit having a cylinder and a piston as well as means for driving the piston inside the cylinder. Advantageously the pressure reduction unit further comprises a position indicator indicating the cycle position of the pressure reduction device and being adapted to provide a control signal for opening or closing at least one valve in the pressure reduction system.

An advantageous embodiment of a pressure reduction device according to the present invention is where the pressure reduction pump is connected to a further pump that drives a pressurization of the energy absorption reservoir. For example the pressure reduction device further comprising an energy reservoir, where the pressurization pump is operatively connected to the reservoir and where the energy absorbed by the pump is converted and transferred to the pressurization pump.

In a preferred embodiment, the energy reservoir drives a pressurization pump adapted to pressurize the feed mixture in the pressurization step (step 2 above) of the high pressure process. In one embodiment of the present invention, this is performed by a low pressure turbine connected to a generator generating electrical energy, and the electricity generated reduces the energy required to drive the pressurization pump in the pressurization step.

The pressure reducing device according to the present invention are typically designed for low stroke speeds (large stroke volume) thereby allowing for the use of actuated valves for filling and emptying of the cylinders rather than check valves. Preferred actuated valves according to the present invention include gate valves and ball valves or a combination thereof.

The stroke speed of the pistons according to an embodiment of the present invention may be from about 1 stroke per minute up to about 150 strokes per minute such as from about 5 strokes per minute up to about 100 strokes per minute. Preferably the stroke speed of the pistons are from about 10 to about 80 strokes per minute such as a stroke speed of the piston in the range 20 strokes per minute to about 60 strokes per minute. Besides allowing for the use of actuated valves the low stroke speed of the piston reduces the wear on pistons, seals and valve seats.

The inlet temperature to the pressure reduction device is generally in the range from about 10° C. to about 250° C. such as from about 20° C. to about 220° C.; preferably the inlet temperature to the pressure amplifying cylinders is in the range from about 50° C. to about 210° C. such as from about 80° C. to about 200° C.; even more preferably the inlet temperature to the pressure amplifying cylinders is in the range from about 100° C. to about 180° C. such as from about 120° C. to about 170° C.

For applications according to the present invention, where the temperature exceeds about 120° C. such as about 140° C., the cylinders may further be equipped with means for cooling the seals of piston in order to withstand the operating conditions.

7. Separation

The depressurized mixture from said pressure reduction containing liquid hydrocarbon product mixture is subsequently lead to separation. The separation may according to the present invention comprise means for separating gas from said mixture. Said separation means may comprise a flash separator or degasser, wherein the product mixture enters the separator above liquid level and gas is withdrawn from the top.

According to an embodiment of the present invention said gas may be used to produce heat for heating in the process to the process as shown in the figure and further described above. The gas may optionally be cooled to condense compounds such as e.g. water prior to said use to produce heat for heating in the process.

A particularly preferred embodiment according to the present invention includes a system where the converted feed mixture/product mixture is first cooled to a temperature of 60 to 250° C., expanded to a pressure in the range from about 10 to about 150 bars such as in the range from about 15 to about 100 bars and led to a phase separator/degasser for separation of the product mixture into at least a gas phase and residual phase.

In an advantageous embodiment the separated gas phase is first cooled to a temperature in the range 80 to about 200° C., expanded to a pressure in the range 60 to 110 bars such as in the range 70 to 100 bars and led to a phase separator/degasser for separation of the converted feed mixture/product mixture into at least a gas phase and a residual phase.

As further exemplified below, the gas phase often comprises carbon dioxide, hydrogen, carbon monoxide, methane, ethane, ethane, propane, iso-propane, butane, iso-butane, water, methanol, ethanol, acetone.

An advantageous embodiment of the present invention includes extracting/separating hydrogen from the separated gas phase and introducing it into said process for upgrading of the hydrocarbons (optional step 8)

An embodiment of the present invention comprises extracting/separating hydrogen from the separated gas phase by a membrane gas separation technique. Another embodiment of the present invention comprises extracting/separating hydrogen using a pressure swing adsorption technique. A further embodiment of the present invention comprises extracting/separating hydrogen from said separated gas phase by the steps of:

separating the converted feed mixture/product mixture into a gas phase and a residual phase cooling the separated gas to a temperature in the range from about 31 to 50° C. and separating the cooled gas phase into a condensed phase substantially free of hydrogen and a residual gas phase enriched in hydrogen and carbon dioxide in a phase separator, further cooling the separated gas phase to a temperature in the range from about 10 up to about 31° C. and separating the cooled residual gas phase into a liquid phase comprising $CO_2$ and a residual gas phase enriched in hydrogen in a separator.

introducing the hydrogen enriched gas in the upgrading process after the pressurization step.

The separating means may further provide at least a coarse separation of the degassed mixture into a liquid hydrocarbon rich stream and residual water rich stream e.g. by gravimetric separation in a 3-phase separator.

The water rich stream comprising water soluble organics, suspended particles and dissolved salts may be at least partly withdrawn from said gravimetric separator, and fed to a recovery unit, optionally after further separation by gravimetric means filtering and/or centrifugation to remove suspended particles.

The degassed mixture or optionally the liquid hydrocarbon rich stream, is withdrawn from said gas separating means, and may be further separated e.g. the liquid hydrocarbon rich stream may be required to be efficiently dehydrated and/or desalted/deashed before being introduced into the upgrading part of the process.

In many aspects of the present invention said further separation comprises one or more gravimetric separation step(-s) optionally equipped with means for coalescing oil or water droplets such as one or more electrostatic coalescing steps. In other aspects of the present invention said further separation may include separation in one or more centrifugation step(-s) such as separation in one or more 3-phase centrifuges such as one or more high speed disc bowl centrifuges and/or one or more decanter centrifuges.

Often the operating temperature of the further separation is selected so as to obtain a dynamic viscosity of the liquid hydrocarbon product in the range from about 1 to about 30 centipoise during said further separation such as in the range from about 1 to about 25 centipoise during said further separation, preferably the temperature of the separation is selected so as to obtain a dynamic viscosity in the range from about 1 to about 20 centipoise such as in the range 5 to 15 centipoise.

The operating temperature of said further separation may according to an embodiment of the present invention be in the range 80 to 250° C. such as in the range 120 to 200° C., preferably at least the first of said further separation is operating at a temperature in the range 130 to 180° C. such as a temperature in the range 150-170° C.

The operating pressure of said further separation may according to an aspect of the present invention be in the range 10 to 120 bar, such as in the range 15-80 bars, preferably said further separation is operating at a pressure in the range 25 to 50 bar, such as in the range 30-50 bars.

Many aspects of the present invention relates to the use of one or more phase separators, where the residence time in each of the phase separators is in the range 1-30 minutes such as in the range 1 to 20 minutes, preferably the residence time in each of the separators are in the range 2 to 15 minutes.

In a further aspect of the present invention a viscosity reducing agent may be added to the converted feed mixture before and/or during the further separation. The viscosity reducing agent may often be an organic solvent having a boiling point below 200° C. such as below 150° C., preferably below 140° C. such as below 130° C.

The weight ratio of the viscosity reducing agent added to the amount of renewable oil may according to many embodiments of the present invention be in the range 0.01 to 2 such as in the range 0.05 to 1, preferably the weight ratio of the viscosity reducing agent added to the amount of low sulphur oxygen containing renewable oil is in the range 0.1 to 0.5 such as in the range 0.1 to 0.4. More preferably the weight ratio of the viscosity reducing agent added to the amount of low sulphur oxygen containing renewable oil is in the range 0.2 to 0.4 such as in the range 0.2 to 0.35.

A preferred embodiment is where the viscosity reducing agent(-s) comprises one or more ketones such as Methyl Ethyl Ketone (MEK) and/or 2-heptanone and/or 2,5 dimethyl-cyclo-pentanone, and/or one or more alcohols such as methanol, ethanol, propanol, isopropanol buthanol, isobutanol and/or one or more aromatic compounds such as toluene, xylene, cumene and/or one or more alkanes such as hexane, n-heptane, octane, nonane, decane, dodecane or a combination thereof.

A particularly preferred embodiment is where the viscosity reducing agent(-s) comprises one or more ketones in a concentration in the range 30-60% by weight, and one or more alcohols in a concentration in the range 5-30% by weight, and one or more aromatics in a concentration in the range 10 to 40% by weight, and one or more alkanes in the concentration in the range 10 to 30% by weight.

Advantageously the viscosity reducing agent comprises a fraction of the low oil and is recovered down stream of said further separation step and prior to providing the low sulphur oxygen containing renewable oil to said optional upgrading step.

According to a preferred embodiment of the present invention the viscosity reducing agent is recovered in an evaporation step such as flash separation and/or distillation step operating at a temperature in the range 100-200° C. such as in the range 100-160° C., preferably the viscosity reducing agent is recovered in an evaporation step operating at a temperature in the range 100-150° C. such as in the range 100-130° C.

A particular preferred embodiment of the present invention is where the viscosity reducing agent is substantially recovered in one or more flash distillation step(-s) producing a low sulphur containing oil phase and a distillate phase, and where the flash temperature is in the range 100-200° C. such as in the range 100-160° C., preferably the viscosity reducing agent is recovered in the flash distillation step producing a low sulphur containing oil phase and a distillate phase, where the flash temperature is in the range 100-150° C. such as in the range 100-130° C.

A washing agent comprising water may according to another aspect of the present invention be added to the liquid hydrocarbon product before or during said further phase separation step in order to further control the salt/ash content of the oil before being introduced to the upgrading step according to the present invention. The washing agent comprising water may according to the present invention be introduced in several steps.

The weight ratio of the washing agent comprising water to oil may advantageously be in the range 0.05 to 5.0 such as a weight ratio of the washing agent comprising water to the oil is in the range 0.05 to 3.0, preferably the of the washing agent comprising water to the oil is in the range 0.1 to 2.0 such as a weight ratio in the range 0.1-1.0.

The washing agent comprising water may according to an embodiment further comprise an acidification agent such as acetic acid or citric acid. The acidification agent may be added so as to obtain a pH of the water phase after separation of the washing agent comprising water in the range 2 to 7 such as a pH in the range 2.5 to 6.5, preferably the acidification agent is added so as to obtain a pH of the water phase after separation of the washing agent comprising water in the range 2.75 to 6 such as a pH in the range 3 to 5.5.

The further separation may according to an embodiment of the present invention further comprise one or more filtration step(-s) of the liquid hydrocarbon product. The filtration step may according to some preferred aspects of the present invention comprise the first step of the further separation and/or the filtration step may be a final step before optionally introducing the oil to an upgrading process according to an embodiment of the present invention.

8. Recovery

The water phases from the gas separating means, and further separation means are fed to a recovery device, where liquid organic compounds in the form of water soluble organics and/or homogeneous catalysts are recovered in a concentrated form, and recycled to into the feed mixture preparation device 1. As mentioned above under 1. Preparation the water soluble organics present in said water phase comprise a complex mixture of hundreds of different compounds including one or more compounds of ketones, alcohols and poly alcohols, phenols and alkylated phenols, carboxylic acids, furans, alkanes, alkenes, toluene, cumene etc.

Preferably said recovery device, comprises one or more evaporation step(-s), wherein water is evaporated from said combined water phases, and thereby providing a distillate and a concentrate. The degree of concentrating is selected so as to provide a distillate amount that corresponds to the amount of water added with the carbonaceous material, homogeneous catalyst and make up base in the pre-treatment. Typically the ratio of concentrate to the combined water phases entering the recovery unit is typically in the range from about 0.1 to about 0.9 such as in the range 0.2 to 0.8. Often the ratio of concentrate to the combined water phases entering the recovery unit is in the range from about 0.25 to about 0.7 such as in the range 0.3 to 0.6. In other embodiments of the present invention the ratio of concentrate to the combined water phases entering the recovery unit is typically in the range from about 0.25 to about 0.6 such as in the range 0.3 to 0.6.

The combined water phases may be preheated to a temperature of e.g. 70-130° C. such as a temperature in the range 80 to 115° C. before entering into said evaporator. The heat for said preheating is preferably provided by heat recovery from a process stream and/or from the outgoing distillate stream before entering into the evaporator. In the evaporator, water is evaporated from said mixture comprising water soluble organics and dissolved salts at a temperature from about 100 to about 115° C. In these cases the heat recovery from said process stream may be performed via a heat transfer medium such as a hot oil.

The pH of the combined water phase entering the recovery is according to the present invention preferably maintained at alkaline conditions such as in the range 7 to 14 such as a pH in the range 8 to 12, preferably the pH of the water phase to the recovery unit is maintained in the range 8 to 11. Operating at such inlet pH to the recovery unit has the advantage of reducing the amount of phenolics in the distillate.

An embodiment of said recovery step according to the present invention is where the recovery step comprises one or more flash step(-s).

A preferred embodiment of said recovery step according to the present invention is where the recovery step comprises evaporation in two or more steps operating at a decreasing pressure and temperature and each being heated with the evaporated vapor from the foregoing step to minimize the heat required for the evaporation.

The evaporator may advantageously further comprise condensing said evaporated vapor in two or more condensation steps, where the condensation temperatures in said condensation steps are decreasing so as to obtain a fractionation of the evaporated fraction i.e. a fraction comprising water and eventually higher boiling compounds, and a fraction where compounds having a boiling point temperature lower than water are concentrated.

Preferably said evaporated vapor passes a demister and/or a foam breaker prior to condensation of said evaporated fraction by cooling. Advantageously the evaporator may according to the present invention further be equipped with a coalescer, where the evaporated fraction is contacted with an absorbent. Said absorbent comprises in a particularly preferred embodiment a base such as sodium hydroxide.

The evaporator according to the present invention may in some embodiments include increasing the condensation temperature of said evaporated water by increasing the pressure by a blower, compressor (Mechanical Vapor Recompression) or a steam jet ejector (Thermal Vapor Recompression) or a combination thereof. Thereby the evaporated water vapor can be used as a heating medium for the evaporation in said evaporator, and said evaporator becomes very energy efficient as the latent heat of evaporation does not need to be supplied to said evaporation step.

It should be noted that said condensers according to the present invention may comprise heat exchangers where the media to be concentrated are evaporated on the other side, but in general said evaporation step according to the present invention comprises at least one additional condenser compared to the number of evaporation steps.

The fraction comprising evaporated water ("distillate") may further be cooled to a temperature suitable for discharge in a cooler. Hereby, it is obtained that said evaporator besides recovering said liquid organic compounds and/or homogenous catalysts also cleans and purifies the water phase in an efficient manner, and can produce a water phase that may be reused or discharged to a recipient. Optionally the "distillate" may be subjected to one or more polishing steps. Said polishing steps may include an absorber and/or adsorber and/or a coalescing step and/or a membrane system such as reverse osmosis and/or a biological treatment system such as a bioreactor.

The fraction being concentrated with compounds having a boiling point lower than water may, according to a preferred embodiment, be mixed with the concentrate from said evaporator, and recycled to the feed mixture preparation step 1.

In many applications according to the present invention a bleed or purge stream is withdrawn from said concentrated water phase prior to recycling to the feed mixture preparation step 1 to prevent buildup of compounds such as chloride. The bleed stream may according to an embodiment of the present invention comprise up to about 40% by weight of the concentrated water phase from the recovery unit such as up to about 25% by weight of the concentrated water phase from the recovery unit. Preferably the bleed stream comprises up to about 20% by weight of the concentrated water phase from the recovery unit such as up to about 15% by weight of the concentrated water phase from the recovery unit. More preferably the bleed stream comprises up to about 10% by weight of the concentrated water phase from the recovery unit such as up to about 5% by weight of the concentrated water phase from the recovery unit. The bleed stream may be disposed off. However, in many applications according to the present invention the bleed stream is further treated.

The concentrated water phase from the recovery unit typically has a positive heating value.

A preferred application according to the present invention comprises further treating the bleed stream by combustion and/or co-combustion in a boiler or incinerator. Optionally the bleed stream is further concentrated prior to said combustion and/or co-combustion.

A particularly preferred embodiment of the present invention comprises further treating the bleed stream in an ion exchange step. The concentrated water phase from the recovery unit may be filtered to remove eventual solids prior to entering said ion exchange step according to the present invention.

The ion exchange step may according to a preferred embodiment of the present invention comprise one or more ion exchange steps such as one or more ion exchange resin(-s) contained in one or more fixed beds. Said one or more ion exchange steps may be arranged with one or more fixed bed(-s) in parallel and/or one or more fixed bed(-s) in series.

An advantageous embodiment of the present invention comprises further treating the bleed stream comprises at least two fixed bed(-s), each containing a chloride selective ion exchange resin capable of selectively adsorbing chloride from said concentrated water phase from said recovery unit and arranged valves in a parallel arrangement so that at least one ion exchange bed is online and at least one ion exchange bed is offline. Hereby continuous operation is ensured and chloride removal can be continued in the ion exchange bed(-s) being online while ion exchange bed(-s) being offline can be cleaned. Said cleaning may according to an embodiment of the present invention be performed by a back flow or back flushing of the ion exchange bed(-s) by demineralized water such as distillate water from the recovery unit. The present invention includes a valve arrangement and/or control system allowing for such cleaning or regeneration by back flow or back flush with demineralized water.

Typically the chloride removal in said ion exchange step according to the present invention is at least 50% of the chlorides in the concentrated water phase entering said ion exchange step such as a chloride removal of at least 60%. In many embodiments according to the present invention the chloride removal in said ion exchange step according to the present invention is at least 70% of the chlorides in the concentrated water phase entering said ion exchange step such as at least 80%. The chloride depleted stream from said chloride ion exchange step is preferably recycled to the feed mixture preparation step 1.

Further, in many embodiments according to the present invention the amount of homogeneous catalyst(-s) in the form of potassium and/or sodium such as being retained in said chloride depleted outlet stream from said chloride ion exchange step is at least 70% by weight of the amount entering said chloride ion exchange step such as at least 80% by weight. Preferably, the amount of homogeneous catalyst(-s) in the form of potassium and/or sodium such as being retained in said chloride depleted outlet stream from said chloride ion exchange step is at least 85% by weight of the amount entering said chloride ion exchange step such as at least 90% by weight. Hereby, less make up homogeneous catalyst is required to be added in the pretreatment step 1, and a more economical process is obtained for providing crude oil to the upgrading process according to the present invention, and thereby an overall more efficient and economical process is obtained.

9. Upgrading

The crude oil produced in step 1 may be optionally be further subjected to an upgrading step to produce finished transportation fuels, lubricants and/or finished fuels or blendstocks for such.

The renewable crude oil may further be subjected to an upgrading process, where it is pressurized to a pressure in the range from about 20 bar to about 200 bars such as a pressure in the range 50 to 120 bar, before being heated to a temperature in the range 300 to 400° C. in one or more steps and contacted with hydrogen and hydrotreating and/or hydroprocessing catalyst(s) contained in one or more reaction zones, and optionally fractionated into different boiling point fractions.

FIG. 6 shows a schematic overview of a continuous high pressure process comprising a prior art heating and cooling system with indirect heat exchange using a hot oil as heat transfer medium.

The pressurized feed mixture enters the heater (3), where it's heated by indirect heat exchange with hot oil such as Dowtherm A. The temperature of the Dowtherm A entering the hot side of the heater (3) is limited to 390° C. due to degradation/coking of the hot oil at higher temperatures, which limits the outlet temperature of the feed mixture to 350-370° C. as further illustrated in illustrative example 2 below. The partly heated feed mixture enters a trim heater, where the feed mixture is heated to the conversion temperature e.g. 410° C., before entering the reactor for conversion of the feed mixture. The trim heater is typically an electrical or fired heater, The product mixture from the reactor(s) is cooled to e.g. 150° C. in the cooler (5) by indirect contact with the cooled hot oil from the heater (3). A trim cooling step using water or a water/glycol mixture is typically required to cool the product mixture to e.g. below 100° C. as dictated by most prior art pressure reduction devices and separation systems.

Though such system provides advantages compared to a heating system with direct incoming feed mixture and outgoing product mixture e.g. the pressure on the shell side may be kept a low pressure (e.g. 10-20 bar) and therefore a lower wall thickness of the shell, provided the system comprises safety means to cope with e.g. a tube burst), and both the feed mixture and product mixture may flow on the inner side of tubes and therefore allow for easier cleaning and more control of the fluid flows inside tubes (e.g avoidance of dead spots), it also possess several disadvantages including:

the hot oil degrades over time due to coking and has a certain maximum temperature above which the degradation becomes severe. For Dowtherm A heat transfer oil, this maximum temperature is about 390° C. Due to the degradation some fouling on the external surface of the heat transfer tubes may occur over time, when using such hot oils even at temperatures below 390° C. Even when operating at working temperatures below the specified maximum temperature the hot oil degrades (though slower) and requires replacement over time an thereby adds to the operating costs.

As the maximum temperature of the hot oil in many embodiments of the present invention is lower than the desired conversion temperature a further heater (trim heater) is required in order to heat the feed mixture to the desired conversion temperature. Prior art trim heaters include heating the feed mixture in a fired heater, which is less controllable than heating using a heat transfer medium (e.g. due to varying composition and heat transfer and fouling properties of the feed mixtures). Hence, there is a risk that the surface temperatures of the heat transfer tubes locally may get too high and make cause overheating of the feed mixture, which may induce undesired coking.

The heating step for the heating the feed mixture (3) and the cooling step for cooling the product mixture is directly coupled. Hence, the outlet temperature of the feed mixture is dependent on the heat transferred from product mixture to the hot oil and vice versa as the trimming of outlet temperatures are performed by the trim heater and the trim cooler. Hence any operational problem e.g. fouling in the feed mixture heater (3) or the product mixture cooler (5) will impact the performance of the other and the overall heat recovery. Hence, oversizing the heat exchangers may be required ensure sufficient performance.

Many product mixtures according to the present invention contains heavy compounds that may solidify if subjected to too low surface temperatures during the cooling process e.g. surface temperatures below 100 to 120° C. If the surfaces temperatures are below such temperatures the heat exchanger tubes may foul or eventually clog over time and thereby reduce the heat transfer efficiency or on stream factor of the heat exchanger. The inlet temperature of cooling media in the trim cooler is often water or a mixture of water and a glycol may be significantly lower than these temperatures, whereby it may be more difficult to control the surface temperatures to temperatures above this level at all operating conditions or the trim cooler may have a reduced turn down ratio or efficiency.

Figure 7:
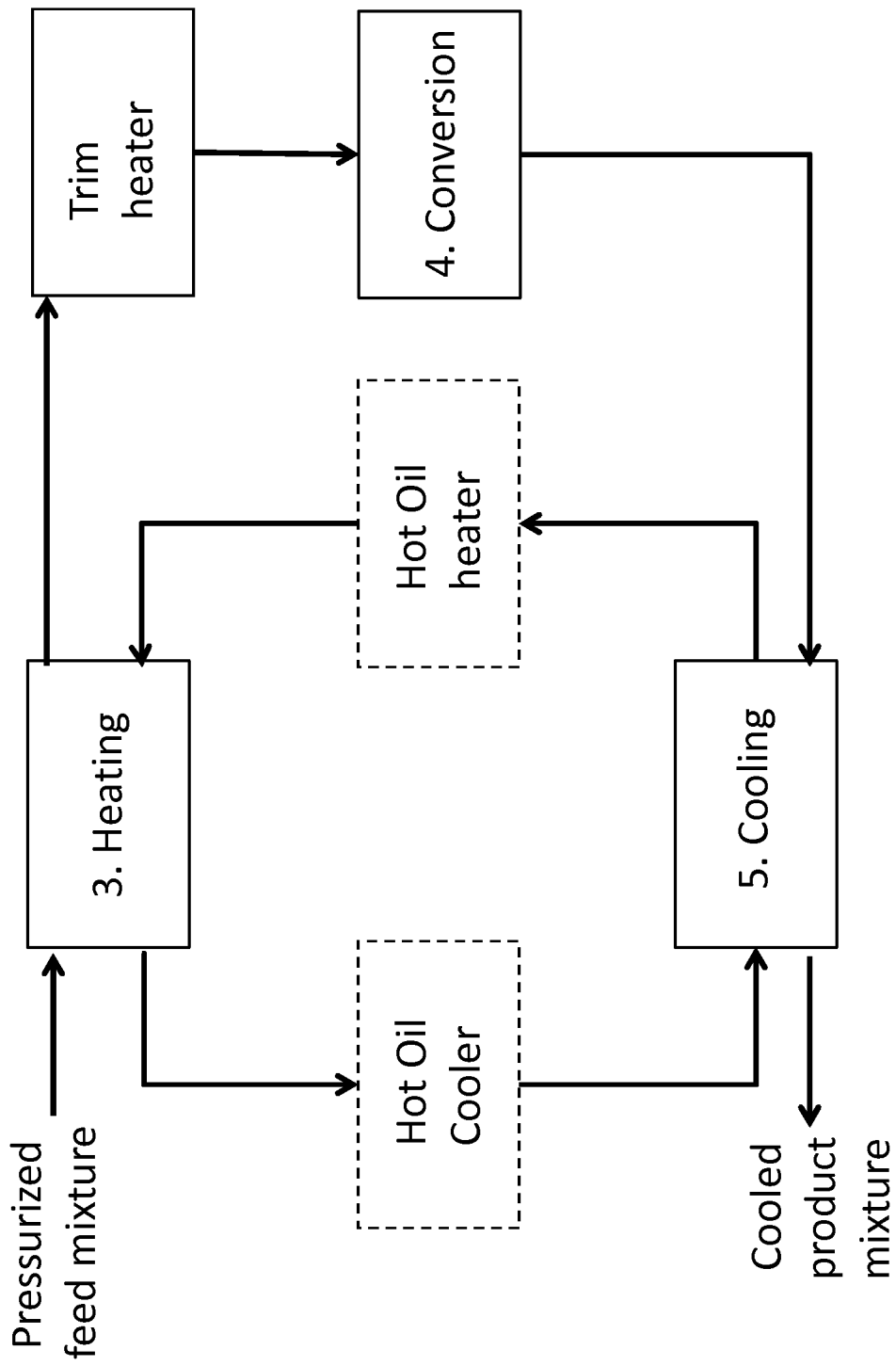
FIG. 7 shows a schematic overview of a continuous high pressure process comprising a prior art heating and cooling system with indirect heat exchange using a hot oil as heat transfer medium further comprising a heater to heat the hot exiting the cooling step, and a trim cooler for cooling the hot oil exiting the heater.

FIG. 7 shows a schematic overview of a continuous high pressure process comprising an improved heating and cooling system with indirect heat exchange using a hot oil as heat transfer medium further comprising a heater to heat the hot exiting the cooling step (5) before entering the hot side of the heat exchanger for heating the feed mixture (3), and a trim cooler for cooling the hot oil exiting the heater for heating the feed mixture (3) before entering the cooler for cooling the product mixture (5). By heating the hot oil before entering the feed mixture heater (3) to a temperature approaching the maximum temperature of the hot oil, the heat transfer efficiency is maximized and the required heat transfer are can be minimized. Further by introducing a hot oil cooler on the hot oil before entering the product mixture cooler (5) the heat transfer area required is minimized, and the feed mixture heating step and product mixture cooling step are decoupled and thereby allowing for a more flexible operation.

Figure 8:
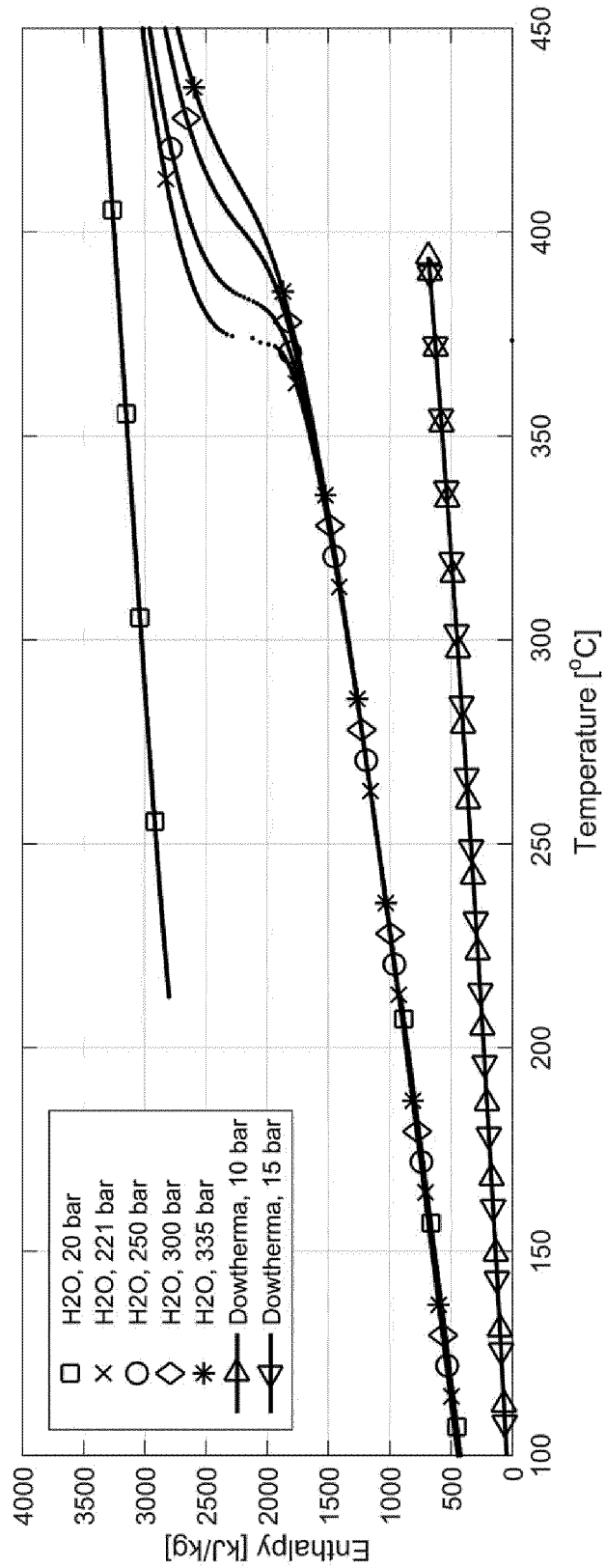
FIG. 8 shows the enthalpy versus temperature for hot oil and water at different pressures.

FIG. 8 shows the enthalpy hot oil (Dowterm A) and water versus temperature at different pressures. As seen from figure significantly more heat can absorbed in water than in hot oil, and thus a significantly higher flow rate is required to provide the heat required to be transferred in order to heat the feed mixture for hot oil. A certain range of velocities is according to the present invention desired for the heat transfer medium desired for efficient heat transfer. At too low velocities the heat transfer coefficient for convective heat transfer becomes too low and there are a risk of sedimentation or deposits of degraded products when operating with hot oil, whereas at too high velocities induces too high wear. According to many applications of the present invention the flow velocity of the heat transfer medium is maintained in the range from about 0.2 m/s to about 10 m/s such as in the range 0.5 m/s to about 6 m/s; preferably the flow velocity of the heat transfer medium is main in the range from about 0.8 m/s to about 4 m/s such as 1 m/s to 3 m/s.

Figure 9:
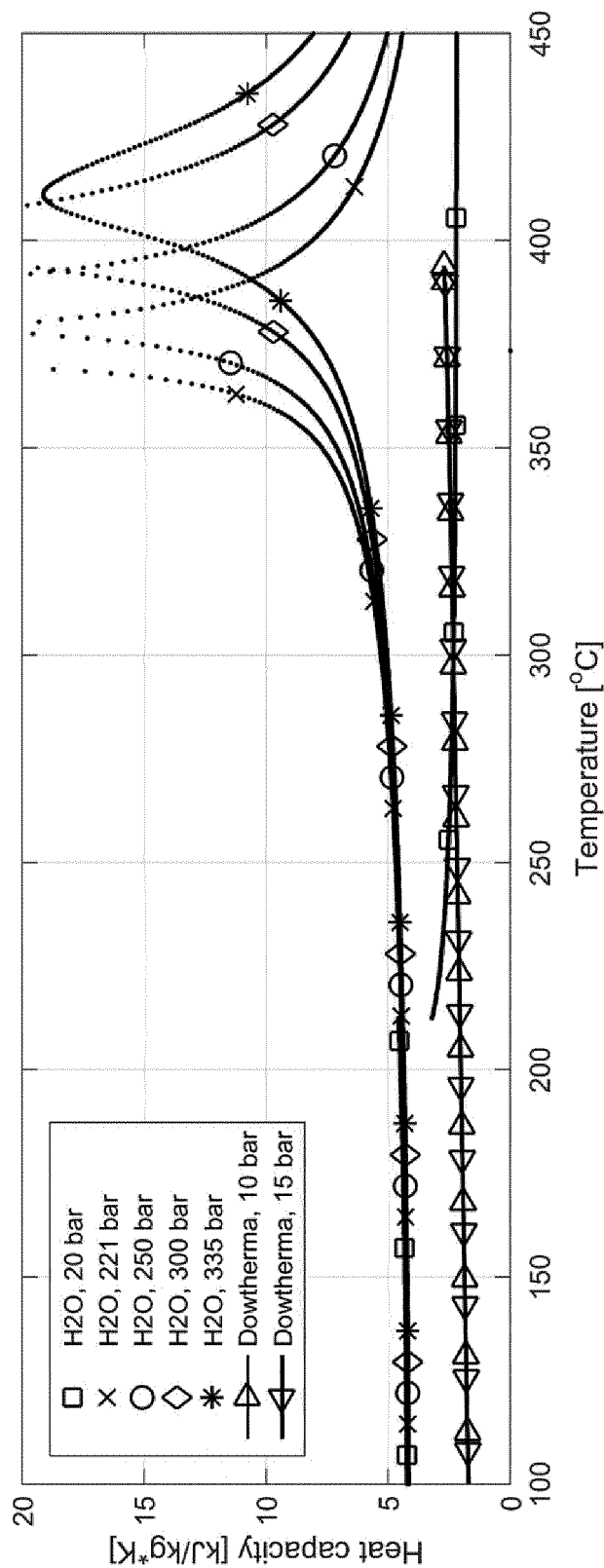
FIG. 9 shows the specific heat capacity versus temperature for hot oil and water at different pressures.

FIG. 9 shows the specific heat capacity of hot oil (Dowterm A) and water versus temperature at different pressures. As seen from figure the specific heat capacity for high pressure water (above its critical point) is significantly higher than for hot oil and for water/steam at low pressure and as a consequence significantly more heat can absorbed in high pressure water than in hot oil and low pressure water, and thus a significantly higher flow rate is required for hot oil and low pressure water/steam in order to provide the heat required to be transferred. Further the higher enthalpy and higher specific heat capacity obtained by high pressure water at supercritical conditions may provide for an improved temperature driving force in the heating and cooling system thereby avoiding that the heat exchangers in contact with the feed mixture and/or products mixture requiring excessively large heat transfer areas to efficiently transfer heat from the cooling step to the heating step and thereby obtain a high heat recovery.

Figure 10:
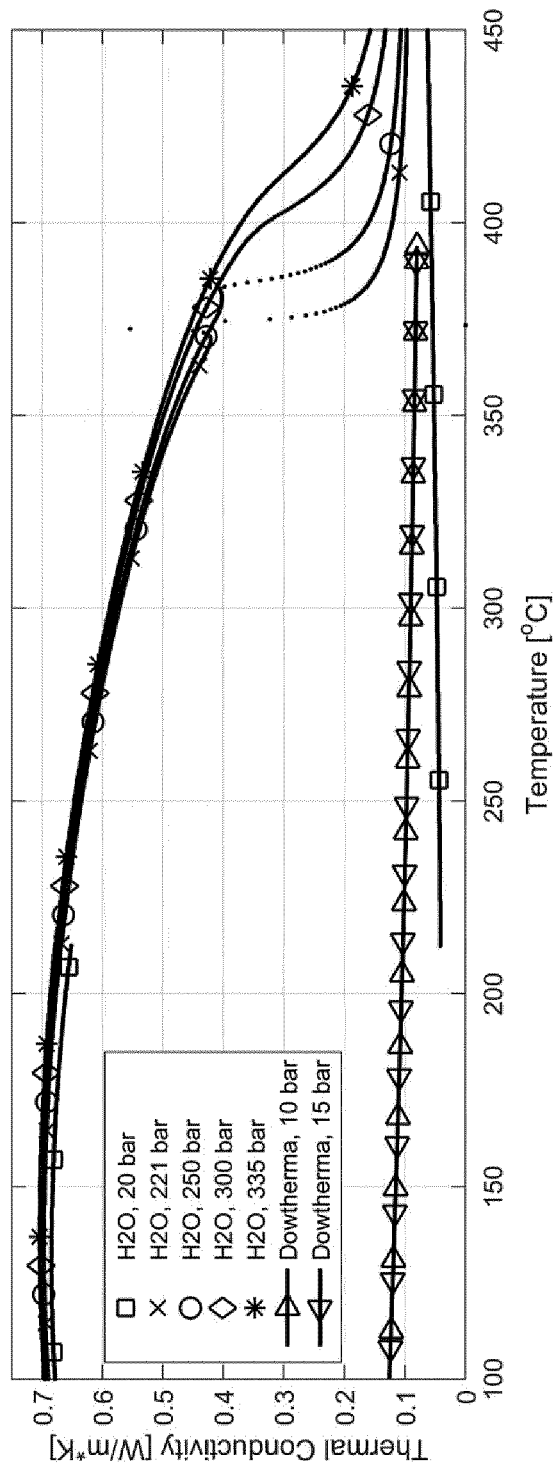
FIG. 10 shows the thermal conductivity versus temperature for hot oil and water at different pressures.
Figure 11:
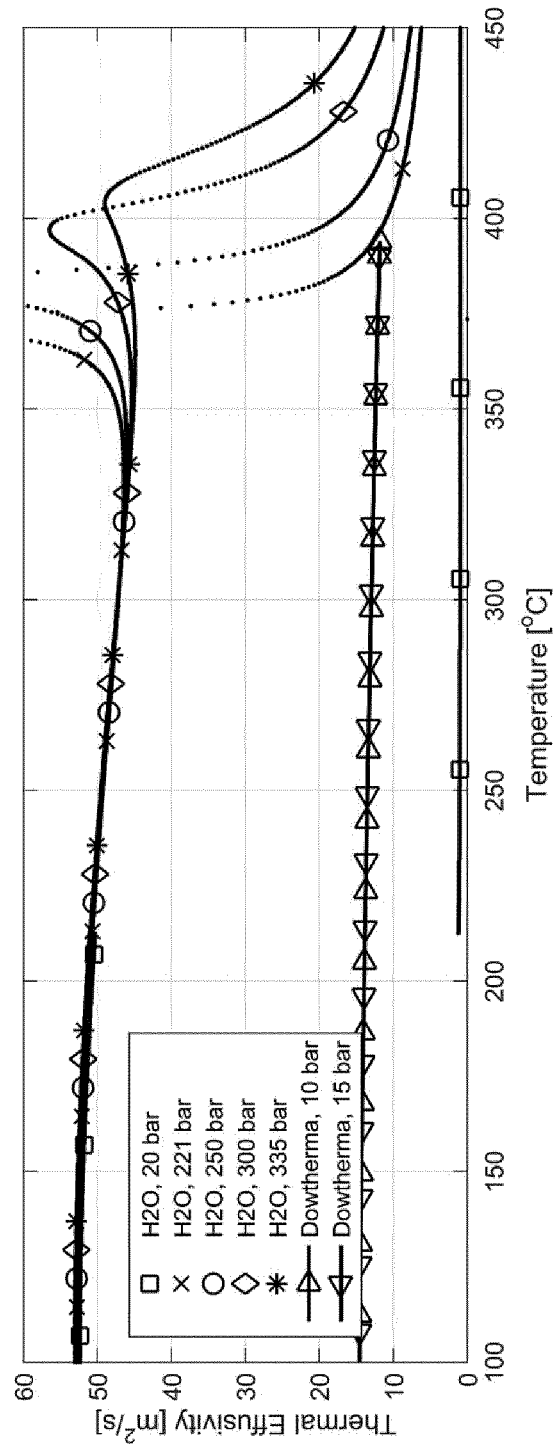
FIG. 11 shows the thermal effusivity versus temperature for hot oil and water at different pressures.

FIG. 10 and FIG. 11 show the thermal conductivity and the thermal effusivity versus temperature for hot oil (Dowtherm A) and water at various pressures. As seen from the figures both thermal conductivity and the thermal effusivity for water at pressures above its critical pressure are significantly higher than for hot oil and low pressure water/steam. A high conductivity is desired as it reduces the thermal boundary layer and thereby provides a more efficient heat transfer. This is further expressed by the thermal effusivity in FIG. 11. The thermal effusivity is a measure, which expresses the ability to exchange thermal energy with its surroundings. Hence, a high effusivity of a heat transfer medium provides an easier and more efficient heat transfer.

Figure 12:
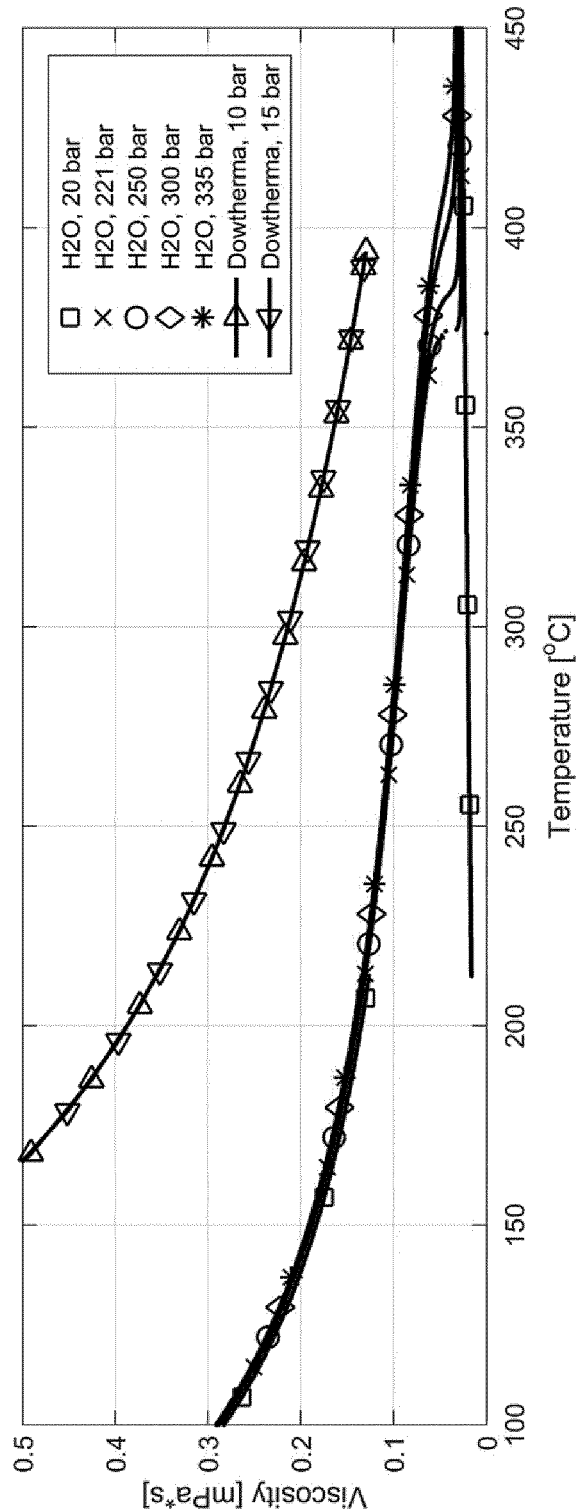
FIG. 12 shows the viscosity versus temperature for hot oil and water at different pressures.

FIG. 12 shows the density of hot oil and water at different pressures versus temperature. As seen from the figure the density of water varies widely at low pressure, whereas the density is more constant for water at sufficiently high pressure and for the hot oil. A low density means that a high flow of heat transfer medium is required to provide the duty for heat transfer. As certain restrictions exists as to the flow velocities that can be achieved large variations in the density means that the heat transfer efficiency will vary through out the heat exchanger and thus make the heat transfer less efficient.

Figure 13:
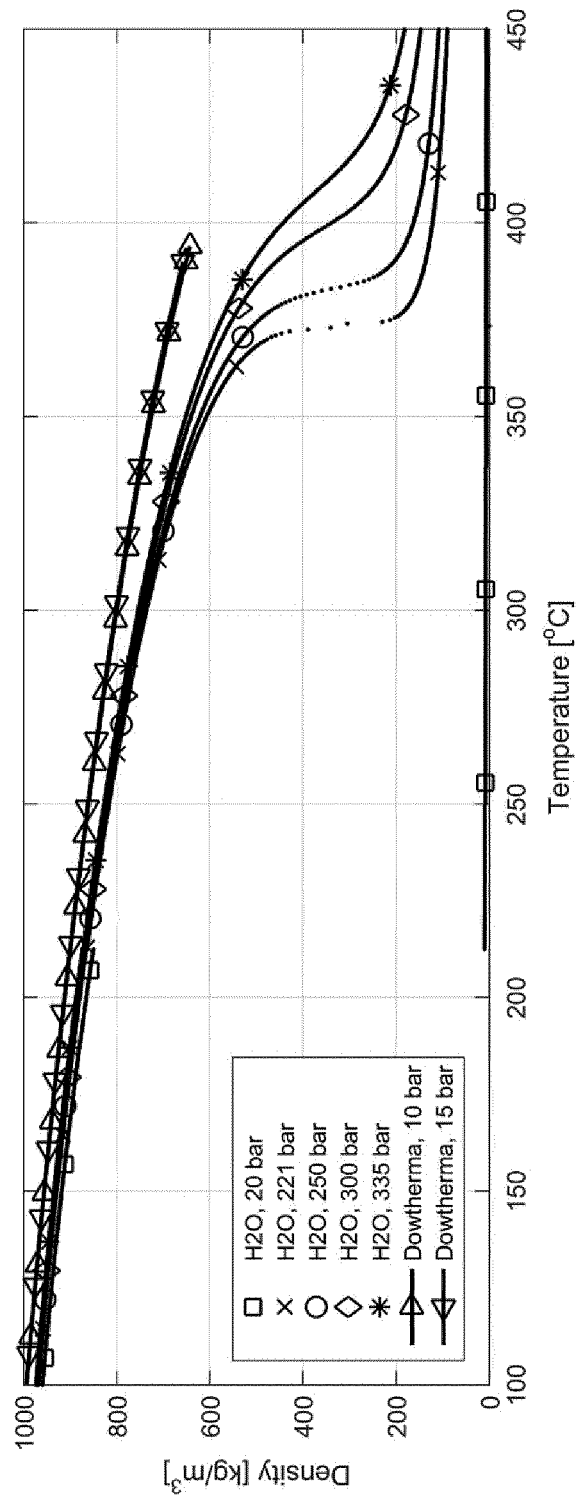
FIG. 13 shows the density versus temperature for hot oil and water at different pressures.

FIG. 13 shows the dynamic viscosity for hot oil and water versus temperature for hot oil and water at different pressures versus temperature. As seen from figure the dynamic viscosity of water is significantly lower than for hot oil. As a higher flow rate is also required for hot oil this results in a higher pressure drop for hot oil than for water if the same heat exchanger configuration is used for both heat transfer media. Further the convective boundary layer will be larger than for water thereby resulting in a less efficient heat transfer.

Figure 14:
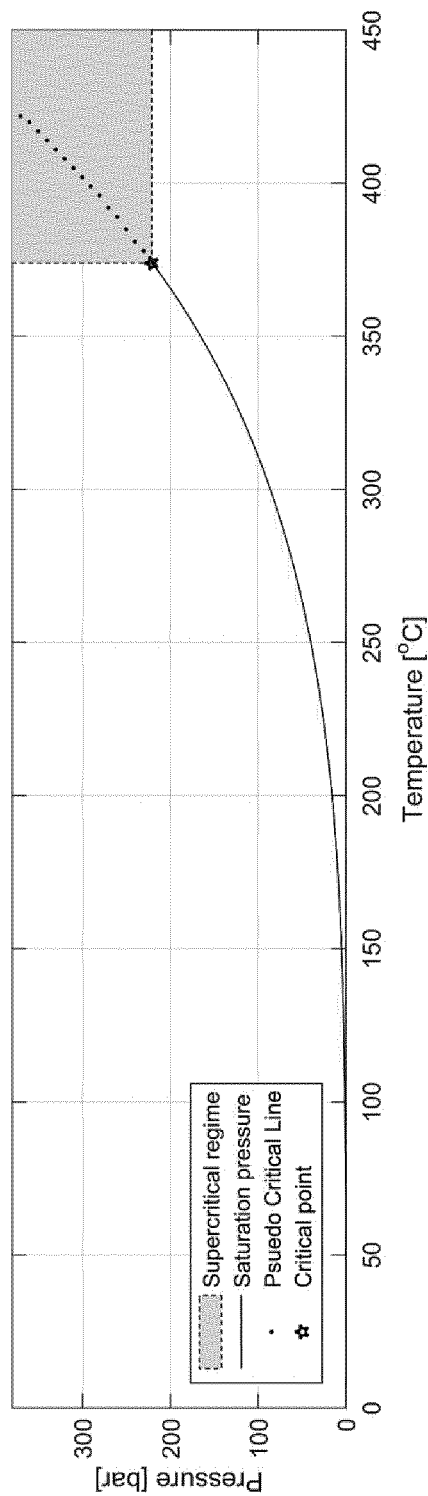
FIG. 14 shows a phase diagram indicating the pseudo critical line.

FIG. 14 shows the saturation pressure of water versus temperature, the critical point, the supercritical regime and the pseudo critical line for water. The pseudo critical line is defined as the temperature at a given pressure above the critical pressure, at which the specific heat capacity is at maximum.

As a general conclusion high pressure water such as at supercritical conditions, provides a more efficient and economical heat transfer medium for heating the feed mixture and/or cooling the product mixture by indirect heat transfer than hot oil. It should further be noted that it is desirable to keep the pressure of the water sufficiently high e.g. below the socalled pseudo critical line (obtained by the 335 bar points in figures), whereby dramatic changes properties by small changes in temperature is avoided.

The invention claimed is:

1. Method of heating and cooling a feed mixture in a continuous high pressure process for transforming carbonaceous materials into liquid hydrocarbon products in a high pressure processing system adapted for processing a feed mixture at a temperature of at least 340° C. and a pressure of at least 150 bar, the high pressure processing system comprising a first and a second heat exchanger having a heat transfer fluid comprising at least 90% water, preferably at least 99% water circulating in the external part of the first and the second heat exchanger, the first heat exchanger comprising a cold internal input side and a hot internal output side, the second heat exchanger comprising a hot internal input side and a cold internal output side, the system further comprising a high pressure water heater and a high pressure water cooler between the first and the second heat exchanger, where the pressurized feed mixture is heated by feeding the feed mixture to the cold internal side of the first heat exchanger, pressurizing and heating the heat transfer fluid to a pressure of at least 240 bar and a temperature of at least 400° C. at the input to the hot external side of the first heat exchanger, where the cooled heat transfer fluid from the first heat exchanger having a temperature in the range 150 to 300° C. is further cooled to a temperature of 60 to 150° C. in the high pressure water cooler prior to entering the cold external side of the second heat exchanger, where the pressurized, heated and converted feed mixture is cooled to a temperature in the range 60 to 250° C. by feeding it to the internal side of the second heat exchanger, and where the partly heated heat transfer fluid is further heated in the high pressure water heater before entering the first heat exchanger, where the process is a continuous high pressure process for transforming carbonaceous materials into renewable hydrocarbons comprising:
Providing a carbonaceous material
Preparing a feed mixture at least comprising:
Carbonaceous material,
water,
homogeneous catalyst in the form of potassium or sodium
liquid organic compounds in the form of recycled water soluble organics and/or renewable hydrocarbons produced by the process
Pressurizing the feed mixture to a conversion pressure of at least 150 bars,
Heating the pressurized feed mixture to a conversion temperature of at least 340° C.,
Maintaining the pressurized feed mixture at conversion pressure and conversion temperature for a predefined time,
Cooling the feed mixture to a temperature in the range 60 to 200° C.,
Depressurizing the feed mixture to a pressure in the range 10 to 100 bar;
Separating the feed mixture into a hydrocarbon phase, water phase comprising dissolved salts and water soluble organics, and a gas phase and optionally a solid phase,
Separating the water phase into a dischargeable water phase and a residual phase comprising potassium and sodium salts and water soluble organic compounds;

At least partly introducing the residual phase to the feed preparation step, where Heat is extracted from converted feed mixture cooling step in the second heat exchanger and transferred to the heating step in the first heat exchanger using a heat transfer fluid comprising at least 90% water, preferably at least 99%, at a pressure of at least 240 bar and a temperature of at least 400° C. at the inlet to the first heat exchanger, and where the cooled heat transfer fluid from the first heat exchanger having a temperature in the range 150 to 300° C. is further cooled to a temperature of 60 to 150° C. in a high pressure water cooler prior to entering the cold external side of the second heat exchanger, where the pressurized, heated and converted feed mixture is cooled to a temperature in the range 80 to 200° C. by feeding it to the inner side of the heat exchanger tubes in said second heat exchanger, and where the partly heated heat transfer fluid from the cooling step in the second heat exchanger is further heated, before entering the hot external side of the heat transfer tubes in feed mixture heating step in the first heat exchanger, where the pressure of the heat transfer fluid is at least 300 bar; and where the temperature of the heat transfer fluid is at least 410° C. before entering the first heat exchanger.

2. Method according to claim 1, where the outlet temperature of the heat transfer fluid from the feed heating step in the first heat exchanger is at least 150° C.

3. Method according to claim 1, where the heat transfer fluid from the heating step in the first heat exchanger is cooled to a temperature of 80 to 150° C. before entering the cooling step in the second heat exchanger.

4. Method according to claim 1, where the converted feed mixture is cooled to a temperature in the range 80 to 200° C. by feeding it to the internal side of the second heat exchanger.

5. Method according to claim 1, wherein the feed mixture is heated to a temperature of at least 370° C. by the high pressure water in the first heat exchanger.

6. Method according to claim 1, where the average velocity of the feed mixture in the heating step and the average velocity of the processed feed flow during the cooling are in the range 0.4 m/s to 5 m/s.

7. Method according to claim 1, where the heat added to the high pressure water before entering the feed mixture heating step in the first heat exchanger is at least partly.

8. Method according to claim 6, where the heat added to the high pressure water before entering the feed mixture heating step in the first heat exchanger is at least partly.

9. Method according to claim 7, where the heat extracted by cooling the high pressure water between the feed mixture heating step in the first heat exchanger and the product cooling step in the second heat exchanger is transferred to a heat transfer medium comprising hot oil, pressurized water or steam, and distributed to the feed mixture preparation step and/or the recovery step and/or upgrading step.

10. Method according to claim 7, where the heat extracted by cooling the high pressure water between the feed mixture heating step in the first heat exchanger and the product cooling step in the second heat exchanger is transferred to a heat transfer medium comprising hot oil, pressurized water or steam, is further heated by the offgas from the high pressure water heating step and distributed to the feed mixture preparation step and/or the recovery step and/or upgrading step.

11. Method according to claim 8, where the heat extracted by cooling the high pressure water between the feed mixture heating step in the first heat exchanger and the product cooling step in the second heat exchanger or by cooling the offgas from the high pressure water heating step is at least partly used for district heating.

12. Method according to claim 1, where the energy recovered in the hydrocarbon product to the total energy added to the system in the form of the carbonaceous material, electricity and heat is at least 65%.

13. Method according to claim 1, where the feed mixture being heated have a dry solid content of at 15% by weight such as a dry matter content of least 17.5 by weight.

14. Method according to claim 2, where the heat transfer fluid from the heating step in the first heat exchanger is cooled to a temperature of 80 to 150° C. before entering the cooling step in the second heat exchanger.

15. Method according to claim 2, where the converted feed mixture is cooled to a temperature in the range 80 to 200° C. by feeding it to the internal side of the second heat exchanger.

16. Method according to claim 3, where the converted feed mixture is cooled to a temperature in the range 80 to 200° C. by feeding it to the internal side of the second heat exchanger.

17. Method according to claim 2, wherein the feed mixture is heated to a temperature of at least 370° C. by the high pressure water in the first heat exchanger.

18. Method according to claim 3, wherein the feed mixture is heated to a temperature of at least 370° C. by the high pressure water in the first heat exchanger.

19. Method according to claim 4, wherein the feed mixture is heated to a temperature of at least 370° C. by the high pressure water in the first heat exchanger.

20. Method according to claim 2, where the average velocity of the feed mixture in the heating step and the average velocity of the processed feed flow during the cooling are in the range 0.4 m/s to 5 m/s.

* * * * *